(12) United States Patent
Seo et al.

(10) Patent No.: US 11,503,547 B2
(45) Date of Patent: Nov. 15, 2022

(54) METHOD FOR MONITORING PHYSICAL DOWNLINK CONTROL CHANNEL OF TERMINAL IN WIRELESS COMMUNICATION SYSTEM, AND DEVICE USING SAME METHOD

(71) Applicant: LG ELECTRONICS INC., Seoul (KR)

(72) Inventors: Inkwon Seo, Seoul (KR); Joonkui Ahn, Seoul (KR); Changhwan Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/648,535

(22) Filed: Jan. 20, 2022

(65) Prior Publication Data

US 2022/0150836 A1 May 12, 2022

Related U.S. Application Data

(63) Continuation of application No. PCT/KR2020/009858, filed on Jul. 27, 2020.

(30) Foreign Application Priority Data

Jul. 26, 2019 (KR) .......................... 10-2019-0090916

(51) Int. Cl.
*H04W 72/04* (2009.01)
*H04W 52/02* (2009.01)
*H04W 76/28* (2018.01)

(52) U.S. Cl.
CPC ..... *H04W 52/0235* (2013.01); *H04W 72/042* (2013.01); *H04W 76/28* (2018.02)

(58) Field of Classification Search
CPC ............ H04W 52/0235; H04W 76/28; H04W 72/042; H04W 72/04
See application file for complete search history.

(56) References Cited

U.S. PATENT DOCUMENTS

| 2019/0394749 | A1* | 12/2019 | Islam | .................... | H04W 68/02 |
| 2020/0146095 | A1* | 5/2020 | Hsieh | ................ | H04W 52/0229 |
| 2020/0288402 | A1* | 9/2020 | Nam | .................... | H04W 72/042 |

(Continued)

OTHER PUBLICATIONS

PCT International Application No. PCT/KR2020/009858, International Search Report dated Oct. 6, 2020, 1 pages.

(Continued)

*Primary Examiner* — Chi Ho A Lee
(74) *Attorney, Agent, or Firm* — Lee, Hong, Degerman, Kang & Waimey PC

(57) ABSTRACT

Provided are a method and device for monitoring a downlink control channel of a terminal in a wireless communication system. The terminal receives configuration information which informs of the position of an SSB or configuration information which informs of the position of an LTE CRS, and receives configuration information which informs of a monitoring occasion for detecting a wake up signal (WUS). If first PDCCH monitoring for detecting the wake up signal is not required since a resource of the monitoring occasion overlaps with a resource of the SSB and/or a resource of the LTE CRS, the terminal performs second PDCCH monitoring in a next discontinuous reception (DRX)-on duration.

20 Claims, 32 Drawing Sheets

(56) References Cited

U.S. PATENT DOCUMENTS

| | | | |
|---|---|---|---|
| 2020/0389874 A1* | 12/2020 | Lin | H04W 72/042 |
| 2021/0076324 A1* | 3/2021 | Kaikkonen | H04W 52/0216 |
| 2021/0099954 A1* | 4/2021 | Agiwal | H04W 4/40 |
| 2021/0144601 A1* | 5/2021 | Kazmi | H04W 36/0088 |
| 2021/0385800 A1* | 12/2021 | Harada | H04W 72/042 |
| 2022/0007286 A1* | 1/2022 | Ciftcioglu | H04W 24/10 |
| 2022/0007342 A1* | 1/2022 | Khoshnevisan | H04W 72/042 |
| 2022/0078708 A1* | 3/2022 | Yang | H04W 52/0229 |
| 2022/0078731 A1* | 3/2022 | He | H04W 52/04 |

OTHER PUBLICATIONS

Qualcomm Incorporated, "Potential Techniques for UE Power Saving," 3GPP TSG-RAN WG1 #96, R1-1903016, Feb.-Mar. 2019, 33 pages.

Qualcomm Inc., "Further discussion on UE behavior upon reception of WUS," 3GPP TSG-RAN WG2 Meeting #106, R1-1906703, May 2019, 4 pages.

NTT Docomo Inc., "Offline summary for PDCCH structure and search space part 2," 3GPP TSG RAN WG1 Meeting #94bis, R1-1811926, Oct. 2018, 66 pages.

Nokia et al., "On UE adaptation to the traffic," 3GPP TSG RAN WG1 #96, R1-1903134, Feb.-Mar. 2019, 10 pages.

Spreadtrum Communications, "Consideration on NR RRM for UE power saving," 3GPP TSG RAN WG1 Meeting #96, R1-1902731, Feb.-Mar. 2019, 11 pages.

Korean Intellectual Property Office Application No. 10-2021-7042558, Office Action dated Aug. 29, 2022, 6 pages.

LG Electronics, "Numerical results for UE power saving schemes", R1-1902052, 3GPP TSG RAN WG1 #96, Mar. 2019, 9 pages.

European Patent Office Application Serial No. 20846938.7, Search Report dated Sep. 15, 2022, 11 pages.

Qualcomm Incorporated, "PDCCH-based power saving channel design", R1-1907294, 3GPP TSG-RAN WG1 #97, May 2019, 16 pages.

3rd Generation Partnership Project (3GPP), "Technical Specification Group Radio Access Network; NR; NR and NG-RAN Overall Descriptionl Stage 2 (Release 15)" 3GPP TS 38.300 V15.6 0, Jun. 2019, 99 pages.

* cited by examiner

METHOD FOR MONITORING PHYSICAL DOWNLINK CONTROL CHANNEL OF TERMINAL IN WIRELESS COMMUNICATION SYSTEM, AND DEVICE USING SAME METHOD

CROSS-REFERENCE TO RELATED APPLICATIONS

This application is a continuation of International Application No. PCT/KR2020/009858, filed on Jul. 27, 2020, which claims the benefit of earlier filing date and right of priority to Korean Application No. 10-2019-0090916, filed on Jul. 26, 2019, the contents of which are all hereby incorporated by reference herein in their entirety.

BACKGROUNDS

Field of the Description

The present disclosure relates to a method for monitoring a physical downlink control channel in a wireless communication system and an apparatus using the method.

Related Art

As a growing number of communication devices require higher communication capacity, there is a need for advanced mobile broadband communication as compared to existing radio access technology (RAT). Massive machine-type communication (MTC), which provides a variety of services anytime and anywhere by connecting a plurality of devices and a plurality of objects, is also one major issue to be considered in nest-generation communication. In addition, designs for communication systems considering services or a user equipment (UE) sensitive to reliability and latency are under discussion. Introduction of next-generation RAT considering enhanced mobile broadband communication, massive MTC, and ultra-reliable and low-latency communication (URLLC) is under discussion. In this disclosure, for convenience of description, this technology may be referred to as new RAT or new radio (NR), NR is also r e erred to as a fifth generation (5G) system.

As the performance and functions of the UE such as display resolution, display size, processor, memory, and application increase of the UE improve, power consumption also increases. Since the power supply of the UE may be limited to the battery, it is important to reduce power consumption. This is the same for a UE operating in NR.

As one example for reducing power consumption of the UE, there is a discontinuous reception (DRX) operation. The UE may have to monitor the physical downlink control channel (PDCCH) in every subframe to know whether there is data to be received. However, since the UE does not always receive data in all subframes, this operation causes unnecessary battery consumption. DRX is an operation to reduce such battery consumption. That is, the UE wakes up in a DRX cycle period and monitors a control channel (e.g., PDCCH) for a predetermined time (DRX-on duration). If there is no PDCCH detection during the time, the UE enters a sleeping mode, that is, a state in which a radio frequency (RF) transceiver is turned off. If the PDCCH is detected during the time (DRX-on duration), the PDCCH monitoring time may be extended and data transmission/reception according to the detected PDCCH may be performed.

Meanwhile, an additional power consumption reduction method may be introduced for such a DRX operation. For example, it may be unnecessary or inefficient for the UE to wake up every DRX cycle to monitor the PDCCH. To this end, the network may provide a signal (let's call it a wake-up signal: WUS) including information related to whether to wake up to the UE before the start of the DRX cycle, and the UE may monitor the WUS at WUS monitoring occasions within the configured WUS monitoring window. The UE may perform an indicated operation in the DRX cycle based on the detected WUS.

However, in some cases, in a situation in which the UE is configured to monitor WUS, a case may occur in which a WUS monitoring occasion overlaps with a resource to be used for essential signal reception. In this case, it is not specified as to how the UE will operate in the WUS monitoring occasion and how the UE should operate in the next DRX cycle associated with the monitoring occasion. As a result, ambiguity between the UE and the network, unnecessary waking or an increase in response latency may occur.

SUMMARY

A technical object of the disclosure is to provide a method and an apparatus for monitoring a physical downlink control channel in wireless communication system.

In one aspect, provided is a method of monitoring a physical downlink control channel (PDCCH) by a user equipment (UE). The method includes receiving first configuration information informing of a position of a synchronization signal/physical broadcast channel block (SSB), receiving second configuration information informing of a monitoring occasion for detecting a wake up signal (WUS) and performing a second PDCCH monitoring in a next discontinuous reception (DRX)-on duration based on the UE being not required a first PDCCH monitoring for detecting the WUS as a resource of the monitoring occasion overlaps a resource of the SSB.

In another aspect, provided is a user equipment (UE). The UE includes a transceiver and a processor connected to the transceiver. The processor is configured to: receive first configuration information informing of a position of a synchronization signal/physical broadcast channel block (SSB), receive second configuration information informing of a monitoring occasion for detecting a wake up signal (WUS) and perform a second PDCCH monitoring in a next discontinuous reception (DRX)-on duration based on the UE being not required a first PDCCH monitoring for detecting the WUS as a resource of the monitoring occasion overlaps a resource of the SSB.

In still another aspect, provided is a method of transmitting a PDCCH by a base station. The method includes transmitting, to a user equipment (UE), first configuration information informing of a position of a synchronization signal/physical broadcast channel block (SSB), transmitting, to the UE, second configuration information informing of a monitoring occasion for detecting a wake up signal (WUS) and transmitting a PDCCH to the UE in a next discontinuous reception (DRX)-on duration based on the UE being not required a first PDCCH monitoring for detecting the WUS as a resource of the monitoring occasion overlaps a resource of the SSB.

In still another aspect, provided is a base station. The base station includes a transceiver for transmitting and receiving a radio signal and a processor connected to the transceiver. The processor is configured to: transmit, to a user equipment (UE), first configuration information informing of a position of a synchronization signal/physical broadcast channel block (SSB), transmit, to the UE, second configuration information informing of a monitoring occasion for detecting a wake up signal (WUS) and transmit, to the UE, a PDCCH in a next discontinuous reception (DRX)-on duration based on the UE being not required a first PDCCH monitoring for detecting the WUS as a resource of the monitoring occasion overlaps a resource of the SSB.

In still another aspect, provided is at least one computer-readable medium (CRM) comprising an instruction executed by at least one processor. The CRM: receive first configuration information informing of a position of a synchronization signal/physical broadcast channel block (SSB), receive second configuration information informing of a monitoring occasion for detecting a wake up signal (WUS) and perform a second PDCCH monitoring in a next discontinuous reception (DRX)-on duration based on 'a first PDCCH monitoring for detecting the WUS' being not required as a resource of the monitoring occasion overlaps a resource of the SSB.

In still another aspect, provided is an apparatus operated in a wireless communication system. The apparatus includes a processor and a memory to be operatively connected to the processor. The processor is configured to: receive first configuration information informing of a position of a synchronization signal/physical broadcast channel block (SSB), receive second configuration information informing of a monitoring occasion for detecting a wake up signal (WUS) and perform a second PDCCH monitoring in a next discontinuous reception (DRX)-on duration based on 'a first PDCCH monitoring for detecting the WUS' being not required as a resource of the monitoring occasion overlaps a resource of the SSB.

In a situation in which the UE is configured to monitor the WUS, the case where the UE is not required to monitor the WUS in the WUS monitoring occasion is clearly specified. In addition, in this case, it is clearly specified how the UE will operate in the next DRX-on duration related to the WUS monitoring occasion. Through this, ambiguity does not occur between the UE and the network, and an increase in response latency can be prevented.

DESCRIPTION OF EXEMPLARY EMBODIMENTS

Figure 1:
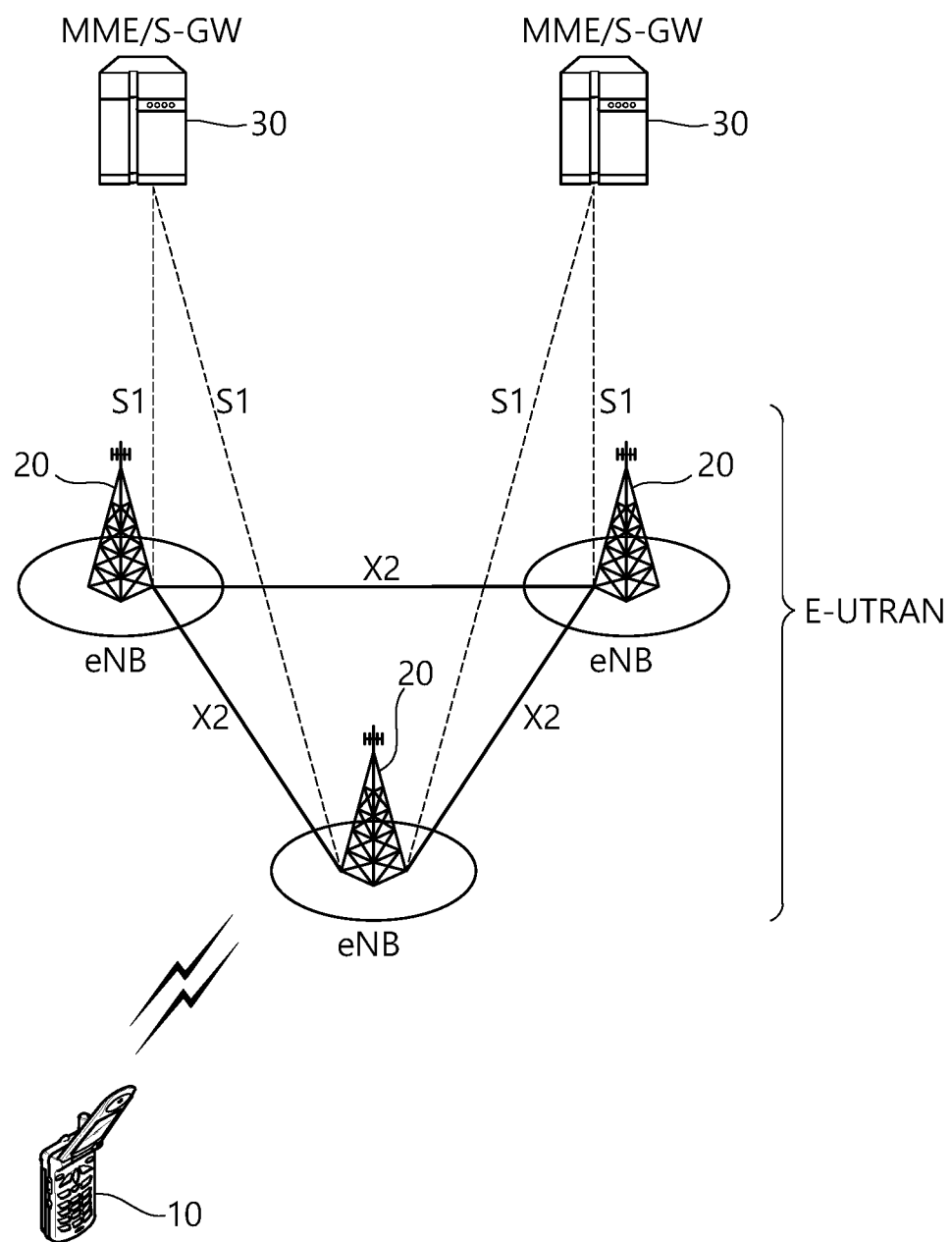
FIG. 1 shows a wireless communication system to which the present disclosure may be applied.

FIG. 1 shows a wireless communication system to which the present disclosure may be applied. The wireless communication system may be referred to as an Evolved-UMTS Terrestrial Radio Access Network (E-UTRAN) or a Long Term Evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, terminal, etc. The BS 20 is generally a fixed station that communicates with the UE 10 and may be referred to as another terminology, such as an evolved node-B (eNB), a base transceiver system (BTS), an access point, gNB, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
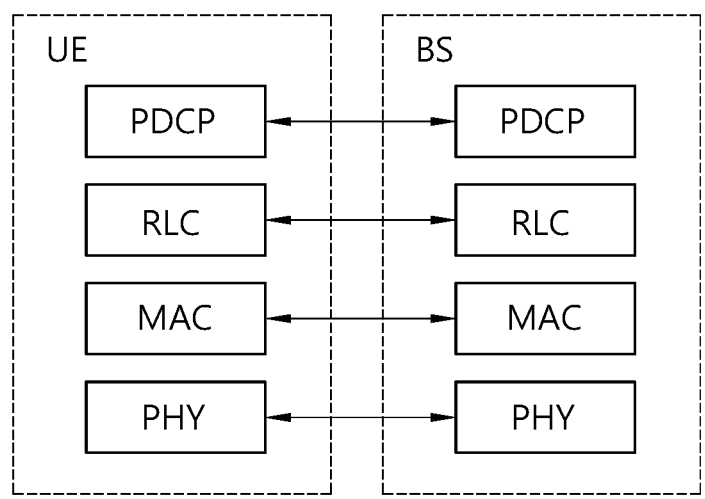
FIG. 2 is a diagram showing a wireless protocol architecture for a user plane.
Figure 3:
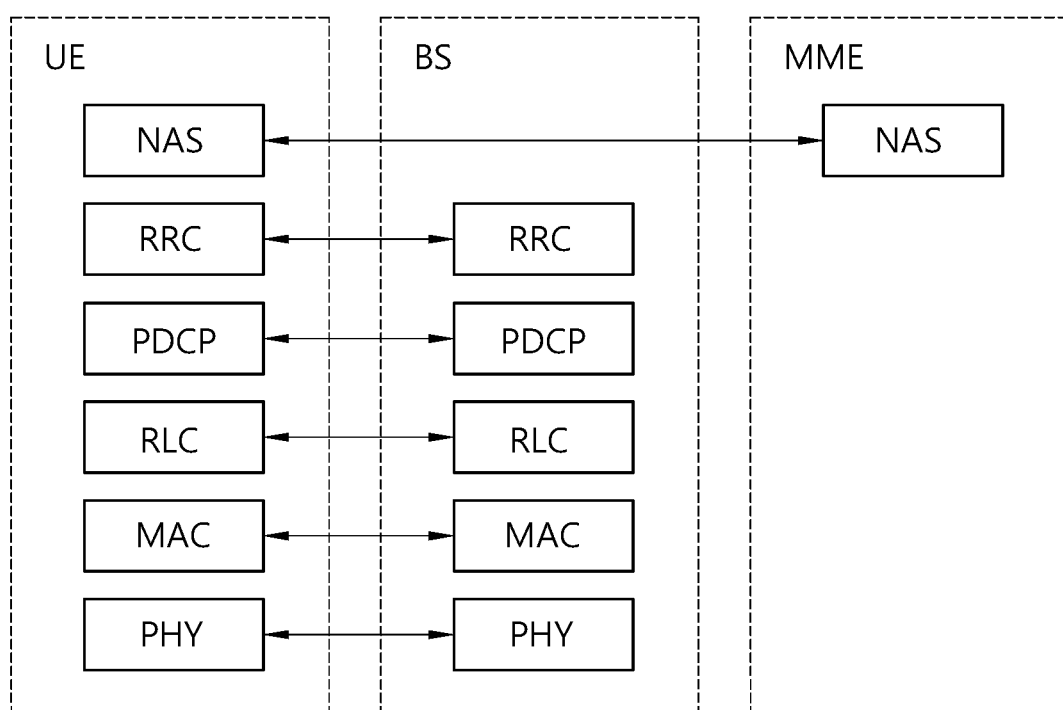
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for transmission.

Hereinafter, a new radio access technology (new RAT, NR) will be described.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultrareliable and low latency communication (URLLC) is discussed. This new technology may be called new radio access technology (new RAT or NR) in the present disclosure for convenience.

Figure 4:
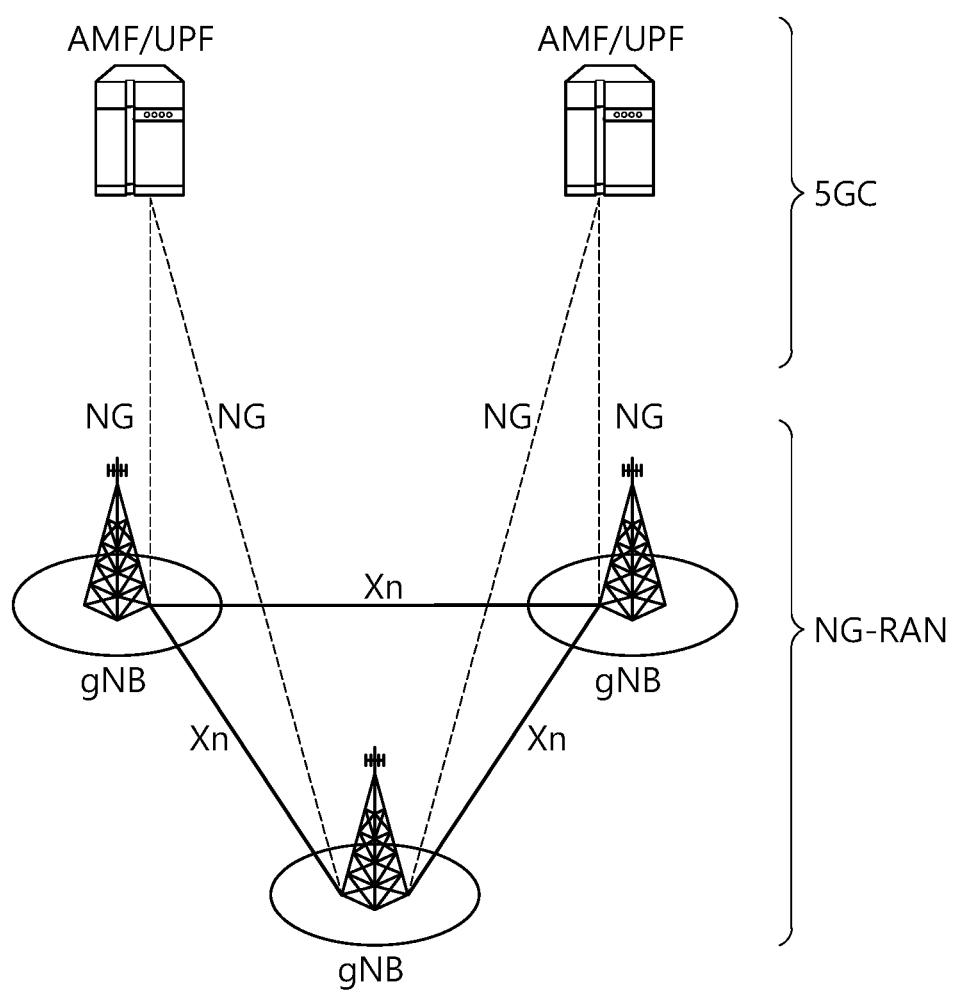
FIG. 4 shows another example of a wireless communication system to which the present disclosure may be applied.

FIG. 4 illustrates a system structure of a next generation radio access network (NG-RAN) to which NR is applied.

Referring to FIG. 4, the NG-RAN may include a gNB and/or an eNB that provides user plane and control plane protocol termination to a UE. FIG. 4 illustrates the case of including only gNB s. The gNB and the eNB are connected by an Xn interface. The gNB and the eNB are connected to a 5G core network (5GC) via an NG interface. More specifically, the gNB and the eNB are connected to an access and mobility management function (AMF) via an NG-C interface and connected to a user plane function (UPF) via an NG-U interface.

Figure 5:
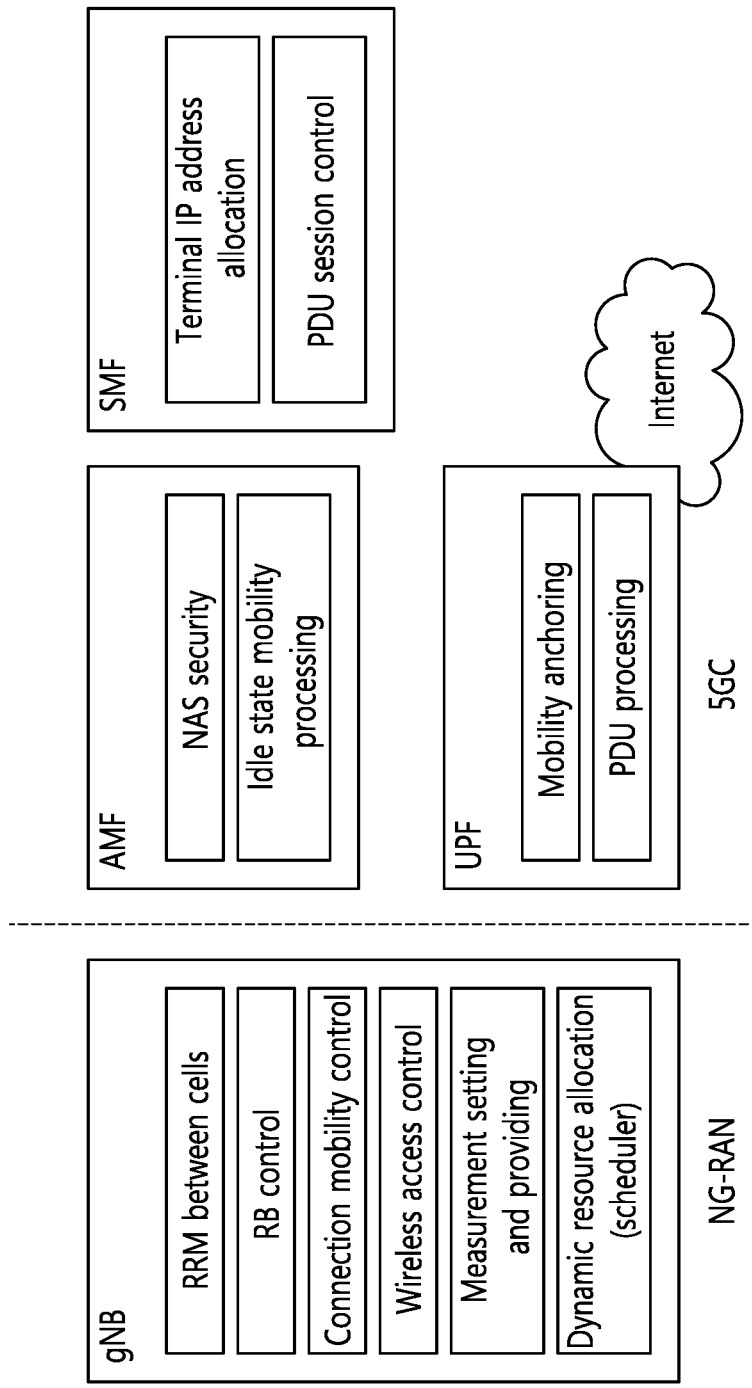
FIG. 5 illustrates a functional division between an NG-RAN and a 5GC.

FIG. 5 illustrates a functional division between an NG-RAN and a 5GC.

The gNB may provide functions such as an inter-cell radio resource management (Inter Cell RRM), radio bearer management (RB control), connection mobility control, radio admission control, measurement configuration & provision, dynamic resource allocation, and the like. The AMF may provide functions such as NAS security, idle state mobility handling, and so on. The UPF may provide functions such as mobility anchoring, PDU processing, and the like. The SMF may provide functions such as UE IP address assignment, PDU session control, and so on.

Figure 6:
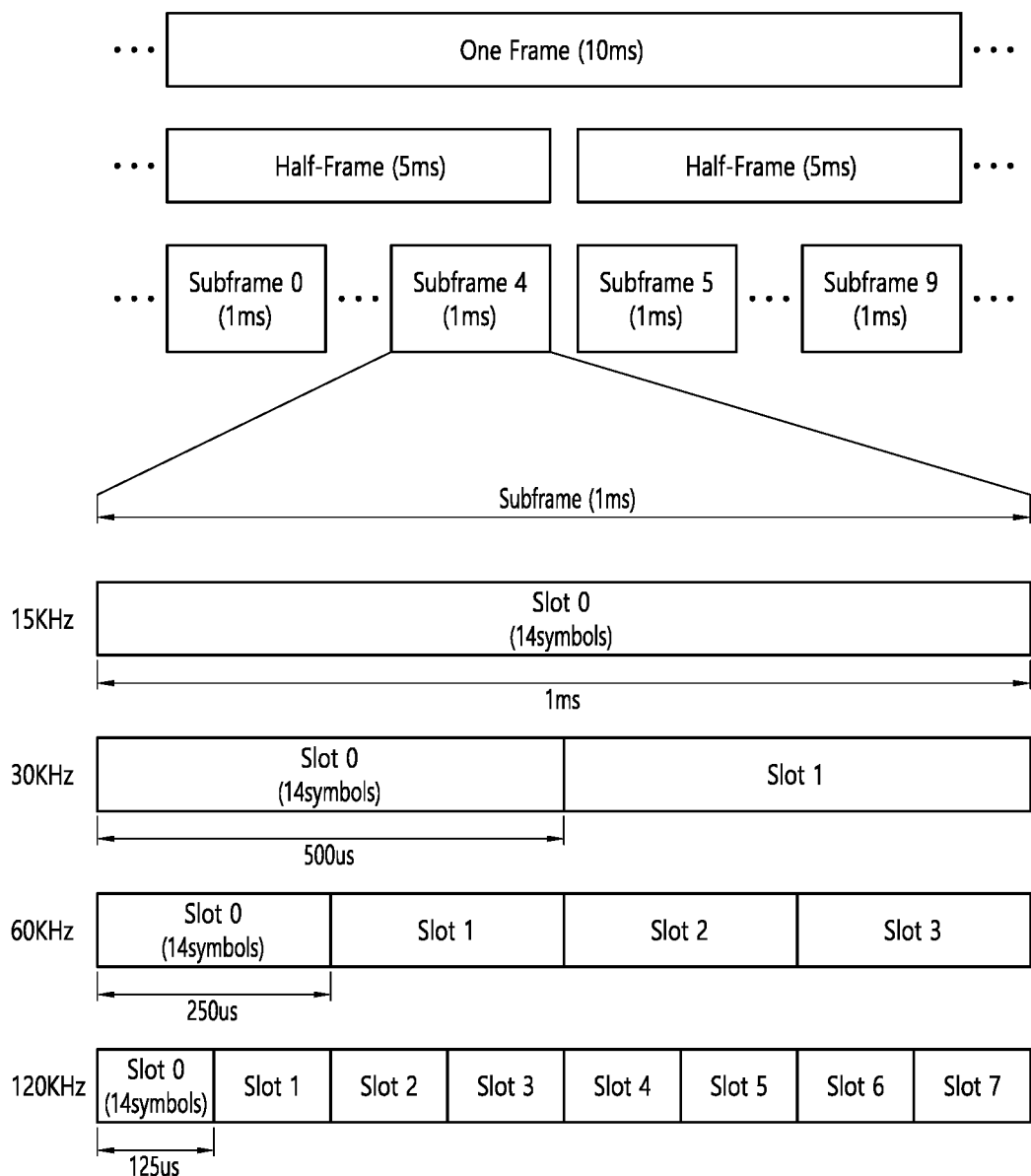
FIG. 6 illustrates an example of a frame structure that may be applied in NR.

FIG. 6 illustrates an example of a frame structure that may be applied in NR.

Referring to FIG. 6, a radio frame (which may be called as a frame hereinafter) may be used for uplink and downlink transmission in NR. A frame has a length of 10 ms and may be defined as two 5 ms half-frames (Half-Frame, HF). A half-frame may be defined as five 1 ms subframes (Subframe, SF). A subframe may be divided into one or more slots, and the number of slots in a subframe depends on subcarrier spacing (SCS). Each slot includes 12 or 14 OFDM(A) symbols according to a cyclic prefix (CP). When a normal CP is used, each slot includes 14 symbols. When an extended CP is used, each slot includes 12 symbols. Here, the symbol may include an OFDM symbol (or a CP-OFDM symbol) and an SC-FDMA symbol (or a DFT-s-OFDM symbol).

The following table 1 illustrates a subcarrier spacing configuration μ.

TABLE 1

| μ | $\Delta f = 2^\mu \cdot 15[kHz]$ | Cyclic prefix |
|---|---|---|
| 0 | 15 | Normal |
| 1 | 30 | Normal |
| 2 | 60 | Normal |
|   |    | Extended |
| 3 | 120 | Normal |
| 4 | 240 | Normal |

The following table 2 illustrates the number of slots in a frame ($N^{frame,\mu}_{slot}$), the number of slots in a subframe ($N^{subframe,\mu}_{slot}$), the number of symbols in a slot ($N^{slot}_{symb}$), and the like, according to subcarrier spacing configurations μ.

TABLE 2

| μ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

In FIG. 6, μ=0, 1, 2, and 3 are exemplified.

Table 2-1 below exemplifies that the number of symbols per slot, the number of slots per frame, and the number of slots per subframe vary according to SCS=(μ=2, 60 KHz) when the extended CP is used.

TABLE 2-1

| μ | $N^{slot}_{symb}$ | $N^{frame,\mu}_{slot}$ | $N^{subframe,\mu}_{slot}$ |
|---|---|---|---|
| 2 | 12 | 40 | 4 |

In an NR system, OFDM(A) numerologies (e.g., SCS, CP length, and so on) may be differently configured between a plurality of cells integrated to one UE. Accordingly, an (absolute time) duration of a time resource (e.g., SF, slot or TTI) (for convenience, collectively referred to as a time unit (TU)) configured of the same number of symbols may be differently configured between the integrated cells.

Figure 7:
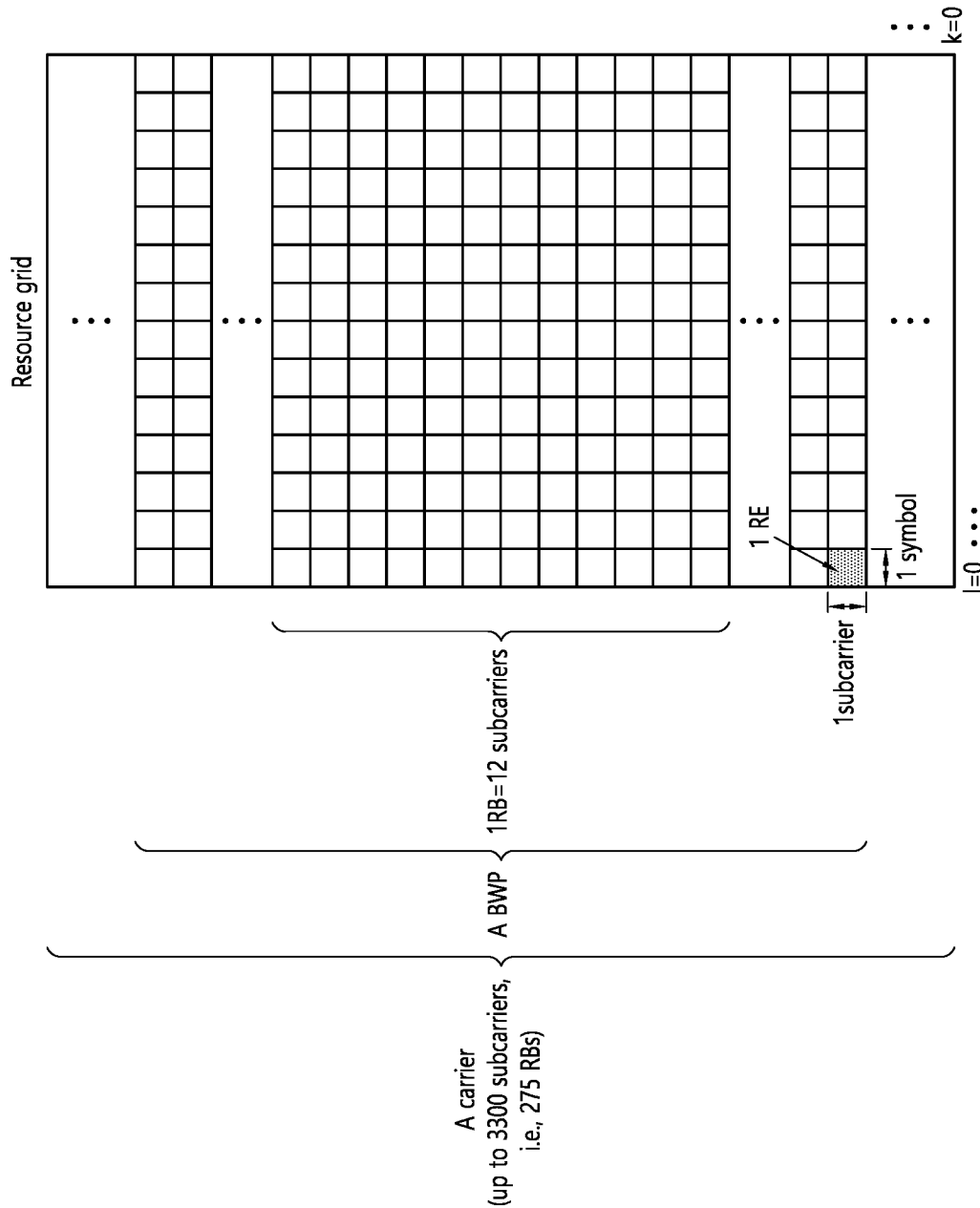
FIG. 7 illustrates a slot structure of the NR frame.

FIG. 7 illustrates a slot structure of a NR frame.

A slot may comprise a plurality of symbols in a time domain. For example, in case of a normal CP, one slot may include 7 symbols. However, in case of an extended CP, one slot may include 6 symbols. The carrier may include a plurality of subcarriers in a frequency domain. A resource block (RB) may be defined as a plurality of consecutive subcarriers (e.g., 12) in the frequency domain. A bandwidth part (BWP) may be defined as a plurality of consecutive (P)RBs in the frequency domain, and may correspond to one numerology (e.g., SCS, CP length, etc.). A carrier may include a maximum of N (e.g., 5) BWPs. Data communication is performed through the activated BWP, and only one BWP can be activated for one UE. Each element in the resource grid is referred to as a resource element (RE), and one complex symbol may be mapped thereto.

A physical downlink control channel (PDCCH) may include one or more control channel elements (CCEs) as illustrated in the following table 3.

TABLE 3

| Aggregation level | Number of CCEs |
|---|---|
| 1 | 1 |
| 2 | 2 |
| 4 | 4 |
| 8 | 8 |
| 16 | 16 |

That is, the PDCCH may be transmitted through a resource including 1, 2, 4, 8, or 16 CCEs. Here, the CCE includes six resource element groups (REGs), and one REG includes one resource block in a frequency domain and one orthogonal frequency division multiplexing (OFDM) symbol in a time domain.

Monitoring means decoding each PDCCH candidate according to a downlink control information (DCI) format. The UE monitors a set of PDCCH candidates in one or more CORESETs (described below) on the activated DL BWP of each activated serving cell for which PDCCH monitoring is configured according to a corresponding search space set.

A new unit called a control resource set (CORESET) may be introduced in the NR. The UE may receive a PDCCH in the CORESET.

Figure 8:
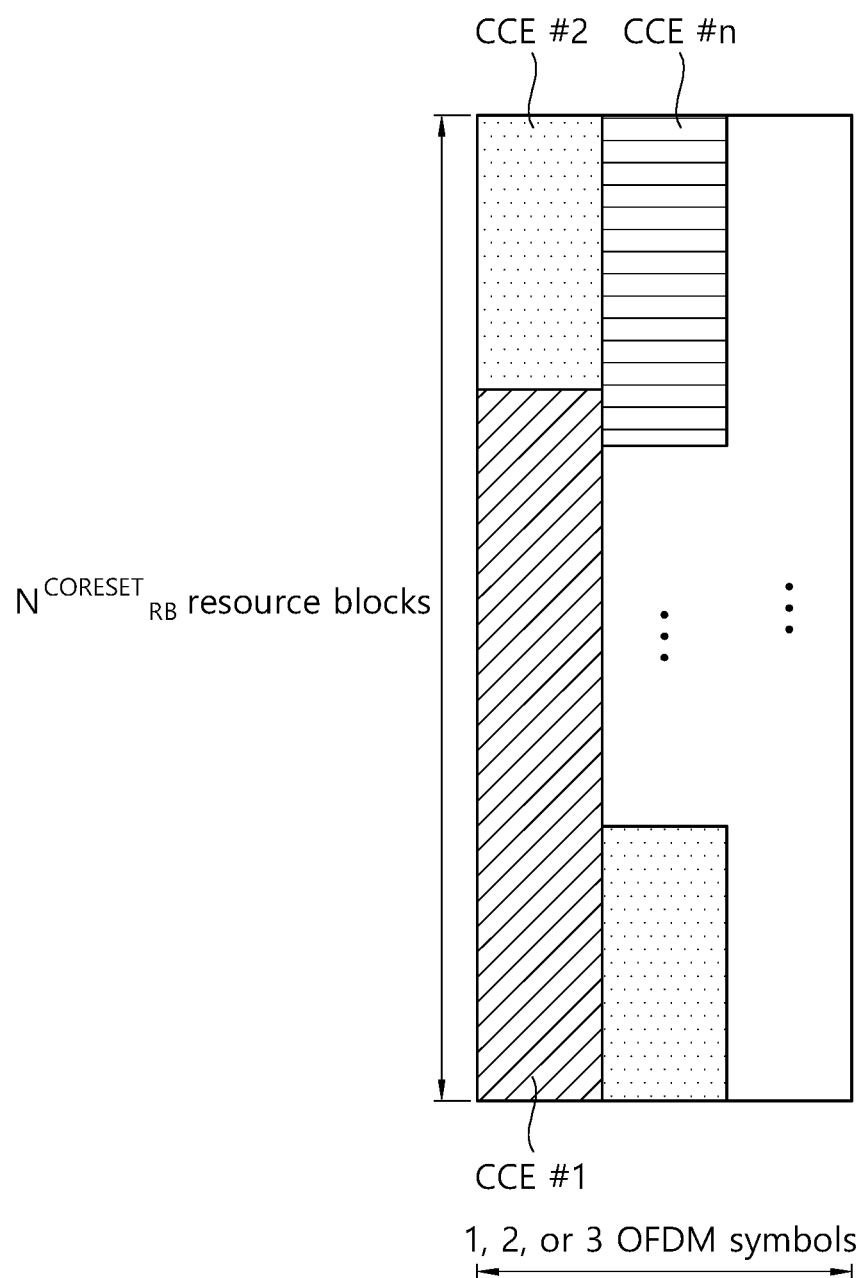
FIG. 8 illustrates a CORESET.

FIG. 8 illustrates a CORESET.

Referring to FIG. 8, the CORESET includes $N^{CORESET}_{RB}$ resource blocks in the frequency domain, and $N^{CORESET}_{symb} \in \{1, 2, 3\}$ number of symbols in the time domain. $N^{CORESET}_{RB}$ and $N^{CORESET}_{symb}$ may be provided by a base station via higher layer signaling. As illustrated in FIG. 8, a plurality of CCEs (or REGs) may be included in the CORESET. One CCE may be composed of a plurality of resource element groups (REGs), and one REG may include one OFDM symbol in the time domain and 12 resource elements in the frequency domain.

The UE may attempt to detect a PDCCH in units of 1, 2, 4, 8, or 16 CCEs in the CORESET. One or a plurality of CCEs in which PDCCH detection may be attempted may be referred to as PDCCH candidates.

A plurality of CORESETs may be configured for the UE.

Figure 9:
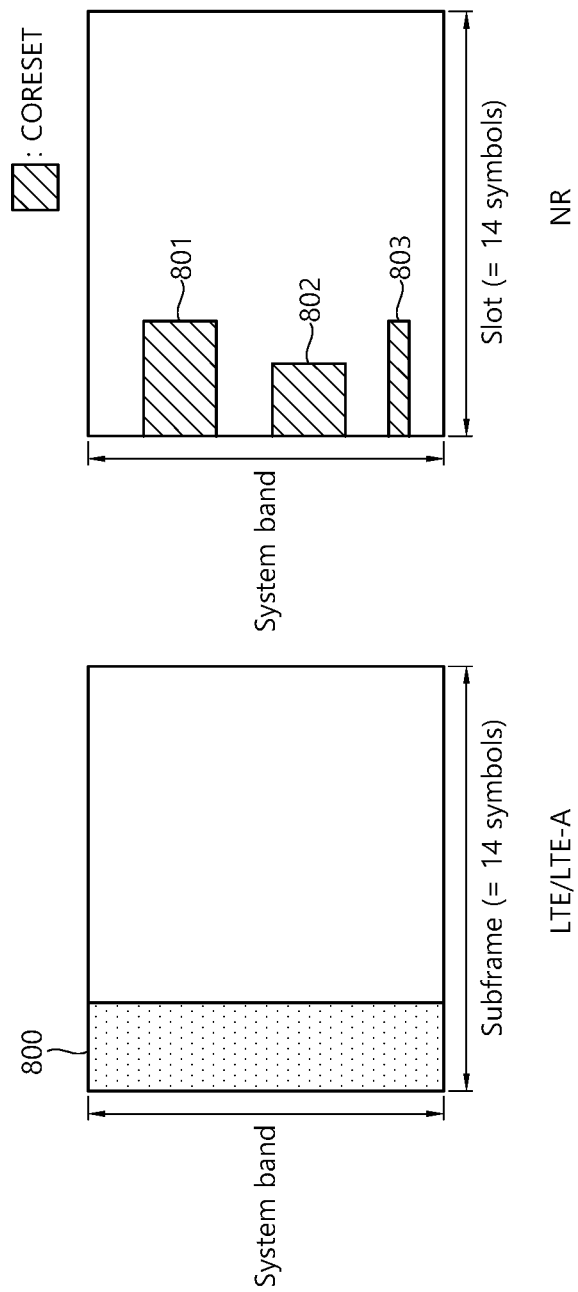
FIG. 9 is a diagram illustrating a difference between a conventional control region and the CORESET in NR.

FIG. 9 is a diagram illustrating a difference between a conventional control region and the CORESET in NR.

Referring to FIG. 9, a control region 800 in the conventional wireless communication system (e.g., LTE/LTE-A) is configured over the entire system band used by a base station (BS). All the UEs, excluding some (e.g., eMTC/NB-IoT UE) supporting only a narrow band, must be able to receive wireless signals of the entire system band of the BS in order to properly receive/decode control information transmitted by the BS.

On the other hand, in NR, CORESET described above was introduced. CORESETs 801, 802, and 803 are radio resources for control information to be received by the UE and may use only a portion, rather than the entirety of the system bandwidth in the frequency domain. In addition, in the time domain, only some of the symbols in the slot may be used. The BS may allocate the CORESET to each UE and may transmit control information through the allocated CORESET. For example, in FIG. 9, a first CORESET 801 may be allocated to UE 1, a second CORESET 802 may be allocated to UE 2, and a third CORESET 803 may be allocated to UE 3. In the NR, the UE may receive control information from the BS, without necessarily receiving the entire system band.

The CORESET may include a UE-specific CORESET for transmitting UE-specific control information and a common CORESET for transmitting control information common to all UEs.

Meanwhile, NR may require high reliability according to applications. In such a situation, a target block error rate (BLER) for downlink control information (DCI) transmitted through a downlink control channel (e.g., physical downlink control channel (PDCCH)) may remarkably decrease compared to those of conventional technologies. As an example of a method for satisfying requirement that requires high reliability, content included in DCI can be reduced and/or the amount of resources used for DCI transmission can be increased. Here, resources can include at least one of resources in the time domain, resources in the frequency domain, resources in the code domain and resources in the spatial domain.

In NR, the following technologies/features can be applied.

<Self-Contained Subframe Structure>

Figure 10:
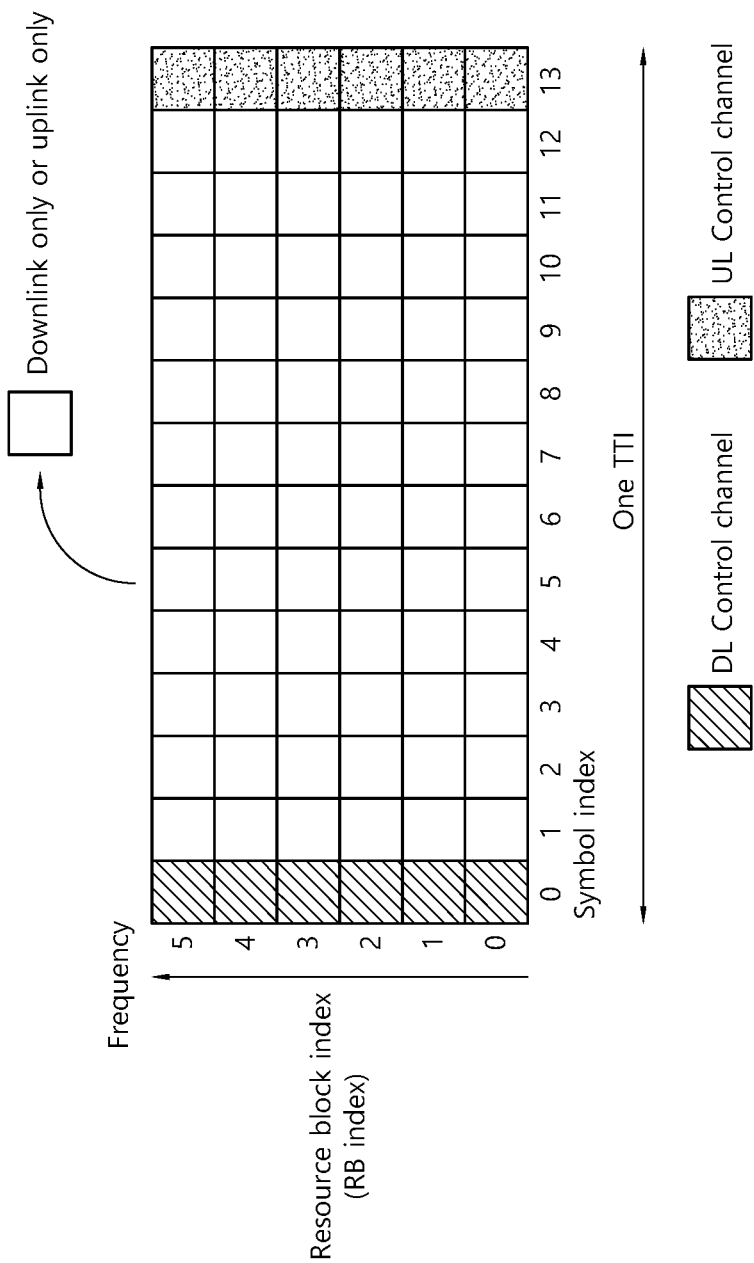
FIG. 10 illustrates an example of a frame structure for new radio access technology.

FIG. 10 illustrates an example of a frame structure for new radio access technology.

In NR, a structure in which a control channel and a data channel are time-division-multiplexed within one TTI, as shown in FIG. 10, can be considered as a frame structure in order to minimize latency.

In FIG. 10, a shaded region represents a downlink control region and a black region represents an uplink control region. The remaining region may be used for downlink (DL) data transmission or uplink (UL) data transmission. This structure is characterized in that DL transmission and UL transmission are sequentially performed within one subframe and thus DL data can be transmitted and UL ACK/NACK can be received within the subframe. Consequently, a time required from occurrence of a data transmission error to data retransmission is reduced, thereby minimizing latency in final data transmission.

In this data and control TDMed subframe structure, a time gap for a base station and a UE to switch from a transmission mode to a reception mode or from the reception mode to the transmission mode may be required. To this end, some OFDM symbols at a time when DL switches to UL may be set to a guard period (GP) in the self-contained subframe structure.

Figure 11:
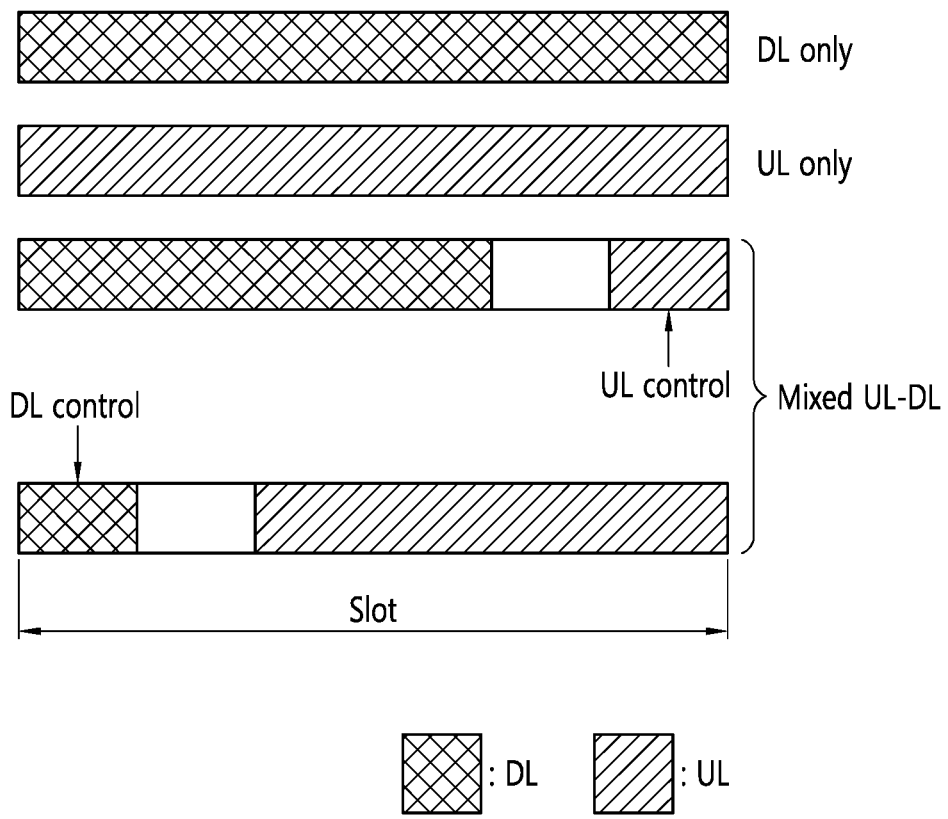
FIG. 11 illustrates a structure of self-contained slot.

FIG. 11 illustrates a structure of self-contained slot.

In NR system, one slot includes all of a DL control channel, DL or UL data channel, UL control channel, and so on. For example, the first N symbols in a slot may be used for transmitting a DL control channel (in what follows, DL control region), and the last M symbols in the slot may be used for transmitting an UL control channel (in what follows, UL control region). N and M are each an integer of 0 or larger. A resource region located between the DL and UL control regions (in what follows, a data region) may be used for transmission of DL data or UL data. As one example, one slot may correspond to one of the following configurations. Each period is listed in the time order.

1. DL only configuration
2. UL only configuration
3. Mixed UL-DL configuration
  DL region+GP (Guard Period)+UL control region
  DL control region+GP+UL region
  a DL region: (i) a DL data region, (ii) DL control region plus DL data region
  a UL region: (i) an UL data region, (ii) UL data region plus UL control region.

In the DL control region, a PDCCH may be transmitted, and in the DL data region, a PDSCH may be transmitted. In the UL control region, a PUCCH may be transmitted, and in the UL data region, a PUSCH may be transmitted. In the PDCCH, Downlink Control Information (DCI), for example, DL data scheduling information or UL data scheduling information may be transmitted. In the PUCCH, Uplink Control Information (UCI), for example, ACK/NACK (Positive Acknowledgement/Negative Acknowledgement) information with respect to DL data, Channel State Information (CSI) information, or Scheduling Request (SR) may be transmitted. A GP provides a time gap during a process where a gNB and a UE transition from the transmission mode to the reception mode or a process where the gNB and UE transition from the reception mode to the transmission mode. Part of symbols belonging to the occasion in which the mode is changed from DL to UL within a subframe may be configured as the GP.

<Analog Beamforming #1>

Wavelengths are shortened in millimeter wave (mmW) and thus a large number of antenna elements can be installed in the same area. That is, the wavelength is 1 cm at 30 GHz and thus a total of 100 antenna elements can be installed in the form of a 2-dimensional array at an interval of 0.5 lambda (wavelength) in a panel of 5×5 cm. Accordingly, it is possible to increase a beamforming (BF) gain using a large number of antenna elements to increase coverage or improve throughput in mmW.

In this case, if a transceiver unit (TXRU) is provided to adjust transmission power and phase per antenna element, independent beamforming per frequency resource can be performed. However, installation of TXRUs for all of about 100 antenna elements decreases effectiveness in terms of cost. Accordingly, a method of mapping a large number of antenna elements to one TXRU and controlling a beam direction using an analog phase shifter is considered. Such analog beamforming can form only one beam direction in all bands and thus cannot provide frequency selective beamforming.

Hybrid beamforming (BF) having a number B of TXRUs which is smaller than Q antenna elements can be considered as an intermediate form of digital BF and analog BF. In this case, the number of directions of beams which can be simultaneously transmitted are limited to B although it depends on a method of connecting the B TXRUs and the Q antenna elements.

<Analog Beamforming #2>

When a plurality of antennas is used in NR, hybrid beamforming which is a combination of digital beamforming and analog beamforming is emerging. Here, in analog beamforming (or RF beamforming) an RF end performs precoding (or combining) and thus it is possible to achieve the performance similar to digital beamforming while reducing the number of RF chains and the number of D/A (or A/D) converters. For convenience, the hybrid beamforming structure may be represented by N TXRUs and M physical antennas. Then, the digital beamforming for the L data layers to be transmitted at the transmitting end may be represented by an N by L matrix, and the converted N digital signals are converted into analog signals via TXRUs, and analog beamforming represented by an M by N matrix is applied.

System information of the NR system may be transmitted in a broadcasting manner. In this case, in one symbol, analog beams belonging to different antenna panels may be simultaneously transmitted. A scheme of introducing a beam RS (BRS) which is a reference signal (RS) transmitted by applying a single analog beam (corresponding to a specific antenna panel) is under discussion to measure a channel per analog beam. The BRS may be defined for a plurality of antenna ports, and each antenna port of the BRS may correspond to a single analog beam. In this case, unlike the BRS, a synchronization signal or an xPBCH may be transmitted by applying all analog beams within an analog beam group so as to be correctly received by any UE.

In the NR, in a time domain, a synchronization signal block (SSB, or also referred to as a synchronization signal and physical broadcast channel (SS/PBCH)) may consist of 4 OFDM symbols indexed from 0 to 3 in an ascending order within a synchronization signal block, and a primary synchronization signal (PSS), secondary synchronization signal (SSS), and a PBCH associated with demodulation reference signal (DMRS) may be mapped to the symbols. As described above, the synchronization signal block may also be represented by an SS/PBCH block.

In NR, since a plurality of synchronization signal blocks (SSBs) may be transmitted at different times, respectively, and the SSB may be used for performing initial access (IA), serving cell measurement, and the like, it is preferable to transmit the SSB first when transmission time and resources of the SSB overlap with those of other signals. To this purpose, the network may broadcast the transmission time and resource information of the SSB or indicate them through UE-specific RRC signaling.

In NR, transmission and reception may be performed based on beams. If reception performance of a current serving beam is degraded, a process of searching for a new beam through the so-called Beam Failure Recovery (BFR) may be performed.

Since the BFR process is not intended for declaring an error or failure of a link between the network and a UE, it may be assumed that a connection to the current serving cell is retained even if the BFR process is performed. During the BFR process, measurement of different beams (which may be expressed in terms of CSI-RS port or Synchronization Signal Block (SSB) index) configured by the network may be performed, and the best beam for the corresponding UE may be selected. The UE may perform the BFR process in a way that it performs an RACH process associated with a beam yielding a good measurement result.

Now, a transmission configuration indicator (hereinafter, TCI) state will be described. The TCI state may be configured for each CORESET of a control channel, and may determine a parameter for determining an RX beam of the UE, based on the TCI state.

For each DL BWP of a serving cell, a UE may be configured for three or fewer CORESETs. Also, a UE may receive the following information for each CORESET.

1) CORESET index p (e.g., one of 0 to 11, where index of each CORESET may be determined uniquely among BWPs of one serving cell), 2) PDCCH DM-RS scrambling sequence initialization value, 3) Duration of a CORESET in the time domain (which may be given in symbol units), 4) Resource block set, 5) CCE-to-REG mapping parameter, 6) Antenna port quasi co-location indicating quasi co-location (QCL) information of a DM-RS antenna port for receiving a PDCCH in each CORESET (from a set of antenna port quasi co-locations provided by a higher layer parameter called 'TCI-State'), 7) Indication of presence of Transmission Configuration Indication (TCI) field for a specific DCI format transmitted by the PDCCH in the CORESET, and so on.

QCL will be described. If a characteristic of a channel through which a symbol on one antenna port is conveyed can be inferred from a characteristic of a channel through which a symbol on the other antenna port is conveyed, the two antenna ports are said to be quasi co-located (QCLed). For example, when two signals A and B are transmitted from the same transmission antenna array to which the same/similar spatial filter is applied, the two signals may go through the same/similar channel state. From a perspective of a receiver, upon receiving one of the two signals, another signal may be detected by using a channel characteristic of the received signal.

In this sense, when it is said that the signals A and B are quasi co-located (QCLed), it may mean that the signals A and B have went through a similar channel condition, and thus channel information estimated to detect the signal A is also useful to detect the signal B. Herein, the channel condition may be defined according to, for example, a Doppler shift, a Doppler spread, an average delay, a delay spread, a spatial reception parameter, or the like.

A 'TCI-State' parameter associates one or two downlink reference signals to corresponding QCL types (QCL types A, B, C, and D, see Table 4).

TABLE 4

| QCL Type | Description |
| --- | --- |
| QCL-TypeA | Doppler shift, Doppler spread, Average delay, Delay spread |
| QCL-TypeB | Doppler shift, Doppler spread' |
| QCL-TypeC | Doppler shift, Average delay |
| QCL-TypeD | Spatial Rx parameter |

Each 'TCI-State' may include a parameter for configuring a QCL relation between one or two downlink reference signals and a DM-RS port of a PDSCH (or PDDCH) or a CSI-RS port of a CSI-RS resource.

Meanwhile, for each DL BWP configured to a UE in one serving cell, the UE may be provided with 10 (or less) search space sets. For each search space set, the UE may be provided with at least one of the following information.

1) search space set index s (0≤s<40), 2) an association between a CORESET p and the search space set s, 3) a PDCCH monitoring periodicity and a PDCCH monitoring offset (slot unit), 4) a PDCCH monitoring pattern within a slot (e.g., indicating a first symbol of a CORSET in a slot for PDCCH monitoring), 5) the number of slots in which the search space set s exists, 6) the number of PDCCH candidates per CCE aggregation level, 7) information indicating whether the search space set s is CSS or USS.

In the NR, a CORESET #0 may be configured by a PBCH (or a UE-dedicated signaling for handover or a PSCell configuration or a BWP configuration). A search space (SS) set #0 configured by the PBCH may have monitoring offsets (e.g., a slot offset, a symbol offset) different for each associated SSB. This may be required to minimize a search space occasion to be monitored by the UE. Alternatively, this may be required to provide a beam sweeping control/data region capable of performing control/data transmission based on each beam so that communication with the UE is persistently performed in a situation where a best beam of the UE changes dynamically.

Figure 12:
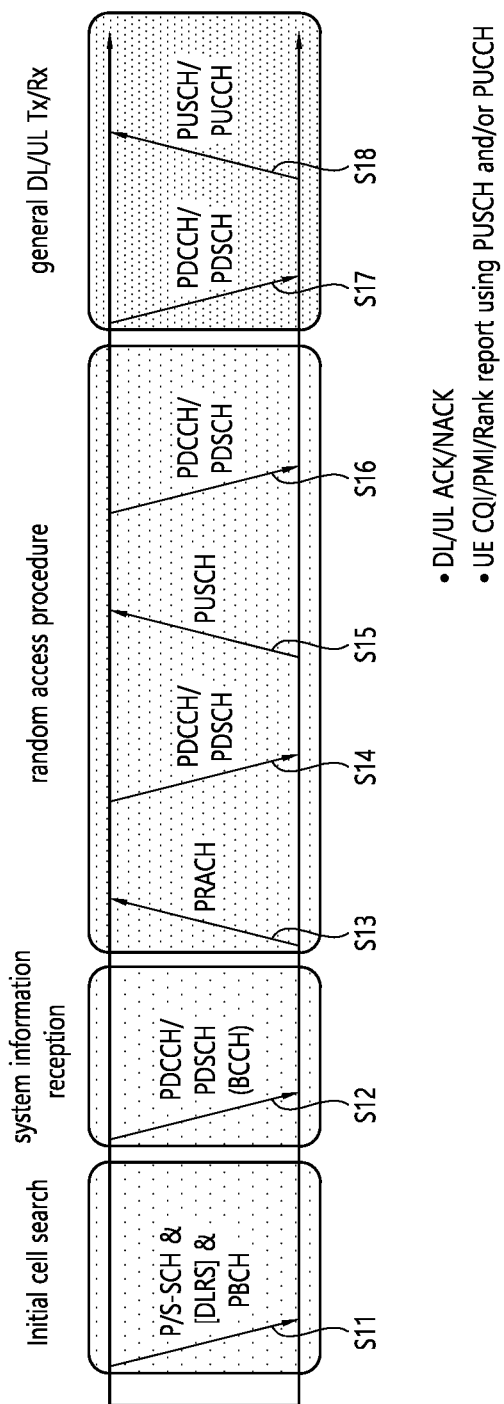
FIG. 12 illustrates physical channels and general signal transmission.

FIG. 12 illustrates physical channels and typical signal transmission.

Referring to FIG. 12, in a wireless communication system, a UE receives information from a BS through a downlink (DL), and the UE transmits information to the BS through an uplink (UL). The information transmitted/received by the BS and the UE includes data and a variety of control information, and there are various physical channels according to a type/purpose of the information transmitted/received by the BS and the UE.

The UE which is powered on again in a power-off state or which newly enters a cell performs an initial cell search operation such as adjusting synchronization with the BS or the like (S11). To this end, the UE receives a primary synchronization channel (PSCH) and a secondary synchronization channel (SSCH) from the BS to adjust synchronization with the BS, and acquire information such as a cell identity (ID) or the like. In addition, the UE may receive a physical broadcast channel (PBCH) from the BS to acquire broadcasting information in the cell. In addition, the UE may receive a downlink reference signal (DL RS) in an initial cell search step to identify a downlink channel state.

Upon completing the initial cell search, the UE may receive a physical downlink control channel (PDCCH) and a physical downlink control channel (PDSCH) corresponding thereto to acquire more specific system information (S12).

Thereafter, the UE may perform a random access procedure to complete an access to the BS (S13-S16). Specifically, the UE may transmit a preamble through a physical random access channel (PRACH) (S13), and may receive a random access response (RAR) for the preamble through a PDCCH and a PDSCH corresponding thereto (S14). Thereafter, the UE may transmit a physical uplink shared channel (PUSCH) by using scheduling information in the RAR (S15), and may perform a contention resolution procedure similarly to the PDCCH and the PDSCH corresponding thereto (S16).

After performing the aforementioned procedure, the UE may perform PDCCH/PDSCH reception (S17) and PUSCH/physical uplink control channel (PUCCH) transmission (S18) as a typical uplink/downlink signal transmission procedure. Control information transmitted by the UE to the BS is referred to as uplink control information (UCI). The UCI includes hybrid automatic repeat and request (HARQ) acknowledgement (ACK)/negative-ACK (NACK), scheduling request (SR), channel state information (CSI), or the like. The CSI includes a channel quality indicator (CQI), a precoding matrix indicator (PMI), a rank indication (RI), or the like. In general, the UCI is transmitted through the PUCCH. However, when control information and data are to be transmitted simultaneously, the UCI may be transmitted through the PUSCH. In addition, the UE may aperiodically transmit the UCI through the PUSCH according to a request/instruction of a network.

In order to enable reasonable battery consumption when bandwidth adaptation (BA) is configured, only one uplink BWP and one downlink BWP or only one downlink/uplink BWP pair for each uplink carrier may be activated at once in an active serving cell, and all other BWPs configured in the UE are deactivated. In the deactivated BWPs, the UE does not monitor the PDCCH, and does not perform transmission on the PUCCH, PRACH, and UL-SCH.

For the BA, RX and TX bandwidths of the UE are not necessarily as wide as a bandwidth of a cell, and may be adjusted. That is, it may be commanded such that a width is changed (e.g., reduced for a period of low activity for power saving), a position in a frequency domain is moved (e.g., to increase scheduling flexibility), and a subcarrier spacing is changed (e.g., to allow different services). A subset of the entire cell bandwidth of a cell is referred to as a bandwidth part (BWP), and the BA is acquired by configuring BWP(s) to the UE and by notifying the UE about a currently active BWP among configured BWPs. When the BA is configured, the UE only needs to monitor the PDCCH on one active BWP. That is, there is no need to monitor the PDCCH on the entire downlink frequency of the cell. A BWP inactive timer (independent of the aforementioned DRX inactive timer) is used to switch an active BWP to a default BWP. That is, the timer restarts when PDCCH decoding is successful, and switching to the default BWP occurs when the timer expires.

Figure 13:
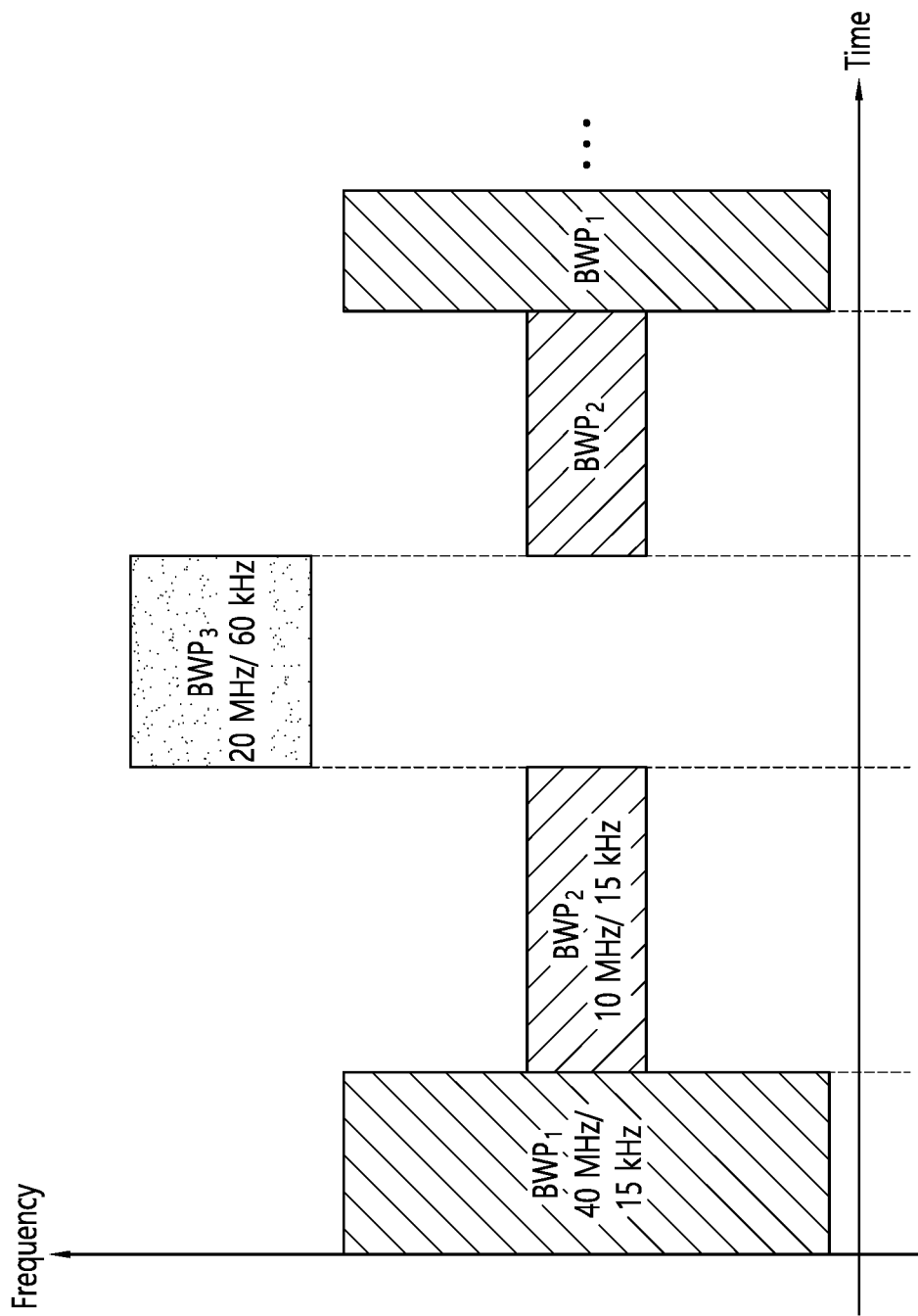
FIG. 13 illustrates a scenario in which three different bandwidth parts are set.

FIG. 13 illustrates a scenario in which three different bandwidth parts are configured.

FIG. 13 shows an example in which $BWP_1$, $BWP_2$, and $BWP_3$ are configured on a time-frequency resource. The $BWP_1$ may have a width of 40 MHz and a subcarrier spacing of 15 kHz. The $BWP_2$ may have a width of 10 MHz and a subcarrier spacing of 15 kHz. The $BWP_3$ may have a width of 20 MHz and a subcarrier spacing of 60 kHz. In other words, each BWP may have a different width and/or a different subcarrier spacing.

Now, discontinuous reception (DRX) will be described.

Figure 14:
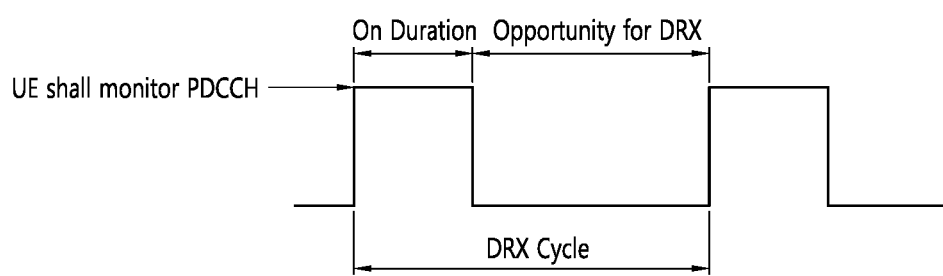
FIG. 14 illustrates a DRX cycle.

FIG. 14 illustrates a DRX cycle.

Referring to FIG. 14, the DRX cycle includes an 'on duration (hereinafter, also referred to as a 'DRX-on duration') and an 'opportunity for DRX'. The DRX cycle defines a time interval in which the on-duration is cyclically repeated. The on-duration indicates a time duration in which a UE performs monitoring to receive a PDCCH. If DRX is configured, the UE performs PDCCH monitoring during the 'on-duration'. If there is a PDCCH successfully detected during the PDCCH monitoring, the UE operates an inactivity timer and maintains an awake state. On the other hand, if there is no PDCCH successfully detected during the PDCCH monitoring, the UE enters a sleep state after the 'on-duration' ends.

Table 5 shows a UE procedure related to DRX (RRC_CONNECTED state). Referring to Table 5, DRX configuration information may be received through higher layer (e.g., RRC) signaling. Whether DRX is ON or OFF may be controlled by a DRX command of a MAC layer. If the DRX is configured, PDCCH monitoring may be performed discontinuously.

TABLE 5

| | Type of signals | UE procedure |
|---|---|---|
| 1st step | RRC signalling (MAC-CellGroupConfig) | Receive DRX configuration information |
| 2nd step | MAC CE ((Long) DRX command MAC CE) | Receive DRX command |
| 3rd step | — | Monitor a PDCCH during an on-duration of a DRX cycle |

MAC-CellGroupConfig may include configuration information required to configure a medium access control (MAC) parameter for a cell group. MAC-CellGroupConfig may also include configuration information regarding DRX. For example, MAC-CellGroupConfig may include information for defining DRX as follows.

Value of drx-OnDurationTimer: This defines a length of a starting duration of a DRX cycle.
  Value of drx-InactivityTimer: This defines a length of a time duration in which the UE is in an awake state, after a PDCCH occasion in which a PDCCH indicating initial UL or DL data is detected.
  Value of drx-HARQ-RTT-TimerDL: This defines a length of a maximum time duration until DL retransmission is received, after DL initial transmission is received.
  Value of drx-HARQ-RTT-TimerUL: This defines a length of a maximum time duration until a grant for UL retransmission is received, after a grant for UL initial transmission is received.
  drx-LongCycleStartOffset: This defines a time length and a starting point of a DRX cycle
  drx-ShortCycle (optional): This defines a time length of a short DRX cycle.

Herein, if any one of drx-OnDurationTimer, drx-InactivityTimer, drx-HARQ-RTT-TimerDL, and drx-HARQ-RTT-TimerUL is operating, the UE performs PDCCH monitoring in every PDCCH occasion while maintaining an awake state.

The UE may know a starting point of a DRX cycle, a duration (duration time) of the DRX cycle, a starting point of an on-duration timer, and a duration of the on-duration timer according to a DRX configuration. Thereafter, the UE attempts reception/detection for scheduling information (i.e., PDCCH) within the on-duration of each DRX cycle (this may be represented that scheduling information is monitored).

If the scheduling information (PDCCH) is detected within the on-duration of the DRX cycle (DRX-on duration), an inactivity timer is activated, and detection is attempted for another scheduling information during a given inactivity timer duration (a time duration in which the inactivity timer runs). In this case, the on-duration and the inactivity timer duration in which the UE performs the signal reception/detection operation may be together referred to as an active time. If the scheduling information is not detected in the on-duration, only the on-duration may be the active time.

When the inactivity timer ends without reception/detection of an additional signal (a control signal or data), the UE does not perform scheduling information and corresponding DL reception/UL transmission until an on-duration of a next DRX cycle (a DRX-on duration) starts after the inactivity timer ends.

A duration adjustment of a DRX cycle, a duration adjustment of an on-duration timer/inactivity timer, or the like plays an important role in determining whether the UE sleeps. According to the setting for a corresponding parameter, the network may configure the UE to frequently sleep or continuously perform monitoring on the scheduling information. This may act as an element for determining whether power saving of the UE will be achieved.

Now, the present disclosure will be described.

The present disclosure proposes a wake up signal (WUS) monitoring method and an apparatus using the method. The WUS may be provided in the form of a DCI format and may be transmitted through a PDCCH. Accordingly, WUS monitoring may have the same meaning as monitoring PDCCH to detect the DCI format.

When the UE performs a power saving related operation after receiving a power saving (PwsS) related configuration from the base station after random access (RA), it may perform a proposal, an embodiment or an operation of the present disclosure, which will be described later. After the random access, when the base station provides/configures a configuration related to power saving to the UE and performs an operation related to power saving, a proposal, an embodiment, or an operation of the present disclosure, which will be described later, may be performed. However, this is not a limitation and is merely an example.

In NR, a resource for which PDCCH monitoring is not performed (in other words, it can be expressed as 'impossible to perform', 'not required to perform', 'difficult to perform', etc., hereinafter the same) may be generated by various factors as well as a slot format indicator (SFI). In the present disclosure, a case in which WUS monitoring is difficult is defined, and a WUS monitoring method and coping method are proposed for each case.

A DRX operation, for example, a connected mode Discontinuous Reception (C-DRX) operation was introduced to save power of the UE. In the C-DRX operation, when there is no PDCCH reception within the on-duration defined for each DRX cycle, the UE enters a sleep mode and doesn't transmit/receive until the next DRX cycle. When the PDCCH is received in the on-duration, an inactivity timer, a retransmission timer, etc. operate to increase the active time, and if there is no additional data reception within the active time, the UE performs the sleep operation until the next DRX operation.

In NR, a wake up signal (WUS) is introduced to obtain a power saving gain in addition to the existing C-DRX operation. The WUS serves to determine whether to perform PDCCH monitoring in the on-duration of each DRX cycle (or multiple DRX cycles). If a WUS is not detected (at a predetermined or indicated WUS monitoring occasion), a sleep operation may be maintained without performing PDCCH monitoring in one or more DRX cycles associated with the corresponding WUS.

Figure 15:
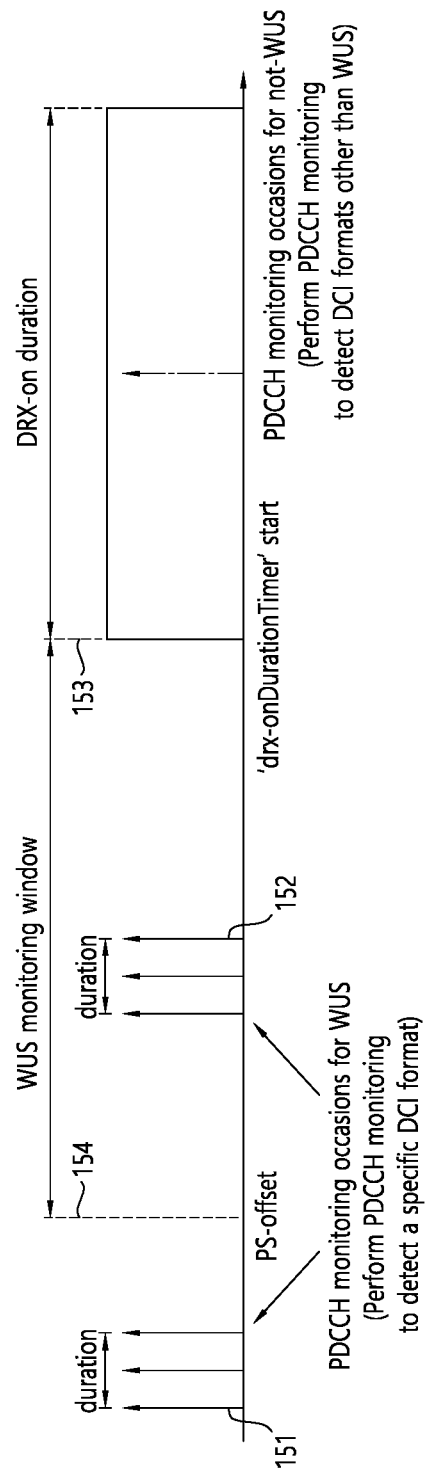
FIG. 15 illustrates a WUS monitoring occasion.

FIG. 15 illustrates a WUS monitoring occasion.

Referring to FIG. 15, the WUS monitoring occasion may be determined, for example, based on a message setting a search space (set). Here, the WUS may be a DCI format including a wake-up indication. For example, DCI format 2_6 is a DCI format used to notify the UE of power saving information outside the DRX active time. DCI format 2_6 may include, for example, a wake-up indication (1 bit), information related to dormancy of the secondary cell, and the like. This DCI format is transmitted through the PDCCH. Accordingly, the WUS monitoring may be expressed as one of PDCCH monitoring. An occasion to monitor such a WUS may be determined by a message setting a search space (set).

The following table is an example of a message for setting a search space (set).

TABLE 6

```
-- ASN1START
-- TAG-SEARCHSPACE-START
SearchSpace ::=                       SEQUENCE {
    searchSpaceId                         SearchSpaceId,
    controlResourceSetId                  ControlResourceSetId
OPTIONAL,   -- Cond SetupOnly
    monitoringSlotPeriodicityAndOffset    CHOICE {
        sl1                                   NULL,
        sl2                                   INTEGER (0..1),
        sl4                                   INTEGER (0..3),
        sl5                                   INTEGER (0..4),
        sl8                                   INTEGER (0..7),
        sl10                                  INTEGER (0..9),
        sl16                                  INTEGER (0..15),
        sl20                                  INTEGER (0..19),
        sl40                                  INTEGER (0..39),
        sl80                                  INTEGER (0..79),
        sl160                                 INTEGER (0..159),
        sl320                                 INTEGER (0..319),
        sl640                                 INTEGER (0..639),
        sl1280                                INTEGER (0..1279),
        sl2560                                INTEGER (0..2559)
    }
OPTIONAL, -- Cond Setup
    duration                        INTEGER (2..2559)               OPTIONAL,   --
Need R
    monitoringSymbolsWithinSlot     BIT STRING (SIZE (14))          OPTIONAL,   --
Cond Setup
    nrofCandidates                        SEQUENCE {
        aggregationLevel1                     ENUMERATED {n0, n1, n2, n3,
n4, n5, n6, n8},
        aggregationLevel2               ENUMERATED {n0, n1, n2, n3, n4,
n5, n6, n8},
        aggregationLevel4               ENUMERATED {n0, n1, n2, n3, n4,
n5, n6, n8},
        aggregationLevel8               ENUMERATED {n0, n1, n2, n3, n4,
n5, n6, n8},
        aggregationLevel16              ENUMERATED {n0, n1, n2, n3, n4,
n5, n6, n8}
    }                                                               OPTIONAL,   --
Cond Setup
    searchSpaceType                       CHOICE {
        common                                SEQUENCE {
            dci-Format0-0-AndFormat1-0            SEQUENCE {
                ...
            }                                   OPTIONAL,   -- Need R
            dci-Format2-0                         SEQUENCE {
                nrofCandidates-SFI                    SEQUENCE {
                    aggregationLevel1             ENUMERATED {n1, n2}
OPTIONAL,   -- Need R
                    aggregationLevel2             ENUMERATED {n1, n2}
OPTIONAL,   -- Need R
                    aggregationLevel4             ENUMERATED {n1, n2}
OPTIONAL,   -- Need R
                    aggregationLevel8             ENUMERATED {n1, n2}
OPTIONAL, -- Need R
                    aggregationLevel16            ENUMERATED {n1, n2}
OPTIONAL -- Need R },
                ...
            }                                                       OPTIONAL,
-- Need R
            dci-Format2-1                   SEQUENCE {
                ...
            }                                                       OPTIONAL,
-- Need R
            dci-Format2-2                         SEQUENCE {
                ...
            }                                                       OPTIONAL,
-- Need R
                dci-Format2-3                         SEQUENCE {
                    dummy1                        ENUMERATED {sl1, sl2, sl4, sl5, sl8, sl10,
sl16, sl20}   OPTIONAL,               -- Cond Setup
                    dummy2                ENUMERATED {n1, n2},
                ...
            }                                                               OPTIONAL
-- Need R
        },
```

TABLE 6-continued

```
    ue-Specific                                                        SEQUENCE {
        dci-Formats              ENUMERATED {formats0-0-And-1-0,
    formats0-1-And-1-1},
        ...
        }
    }                                                                  OPTIONAL    --
    Cond Setup
    }
-- TAG-SEARCHSPACE-STOP
-- ASN1STOP
```

In the table, 'duration' is the number of consecutive slots of the search space that are lasted at every occasion given by periodicity and offset (Number of consecutive slots that a SearchSpace lasts in every occasion, i.e., upon every period as given in the periodicityAndOffset).

'monitoringSlotPeriodicityAndOffset' indicates slots for PDCCH monitoring composed of periodicity and offset. When the UE is configured to monitor DCI format 2_1, only the values 's11', 's12' or 's14' may be applicable. When the UE is configured to monitor DCI format 2_0, only the values 's11', 's12', 's14', 's15', 's18', 's110', 's116' and 's120' may be applicable.

'monitoringSymbolsWithinSlot' indicates the first symbol(s) for PDCCH monitoring in the slots configured for PDCCH monitoring (see monitoringSlotPeriodicityAndOffset and duration). The most significant (left) bit represents the first OFDM in a slot, and the second most significant (left) bit represents the second OFDM symbol in a slot and so on. The bit(s) set to one identify the first OFDM symbol(s) of the control resource set within a slot. If the cyclic prefix of the BWP is set to extended CP, the last two bits within the bit string shall be ignored by the UE. For DCI format 2_0, the first one symbol applies if the duration of CORESET identified by controlResourceSetId indicates 3 symbols, the first two symbols apply if the duration of CORESET identified by controlResourceSetId indicates 2 symbols, and the first three symbols apply if the duration of CORESET identified by controlResourceSetId indicates 1 symbol.

'nrofCandidates-SFI' indicates the number of PDCCH candidates for DCI format 2-0 for the configured aggregation level. If an aggregation level is absent, the UE does not search for any candidates with that aggregation level. The network configures only one aggregationLevel and the corresponding number of candidates.

'nrofCandidates' indicates the number of PDCCH candidates per aggregation level. The number of candidates and aggregation levels configured here applies to all formats unless a particular value is specified or a format-specific value is provided.

As described above, 'monitoringSlotPeriodicityAndOffset' of Table 6 may inform slots for PDCCH monitoring based on periodicity and offset. And it can be said that these slots correspond to an occasion for PDCCH monitoring. Also, 'duration' indicates consecutive slots in which the search space lasts at each occasion. In FIG. 15, 151 and 152 can be referred to as PDCCH monitoring occasion configured by 'monitoringSlotPeriodicityAndOffset', and the search space lasts in three consecutive slots in each PDCCH monitoring occasion.

Meanwhile, among the PDCCH monitoring occasions configured as described above, the PDCCH monitoring occasion capable of monitoring the WUS may be limited to being within the interval (let's call this the WUS monitoring window) between the start slot of the DRX-on duration (that is, a slot where drx-onDurationTimer starts, 153) and the time (154) indicated by the offset (PS-offset) value. That is, in FIG. 15, 151 is outside the WUS monitoring window, and 152 is within the WUS monitoring window. Accordingly, the UE may perform PDCCH monitoring for WUS detection only at the PDCCH monitoring occasion corresponding to 152.

When the UE detects WUS within the WUS monitoring window, it may perform a necessary operation in the DRX-on duration based on the WUS. For example, if the WUS instructs the UE to wake up, PDCCH monitoring for detecting a general DCI format other than the WUS may be performed by waking up in the DRX-on duration (i.e. it can also be expressed that the UE starts the drx-onDurationTimer).

Meanwhile, in NR, in order to increase scheduling flexibility and resource utilization, the transmission direction (e.g., downlink/uplink) of each slot and symbol may be dynamically changed. And in order to perform the corresponding operation, a slot format indicator (SFI) may be transmitted through DCI format 2_0.

DCI format 2_0 may be defined as follows. DCI format 2_0 is a DCI format used for notifying the slot format, and the following information may be transmitted by means of the DCI format 2_0 with CRC scrambled by SFI-RNTI.

Slot format indicator 1, slot format indicator 2, . . . , slot format indicator N.

The size of DCI format 2_0 can be set by a higher layer and can be up to 128 bits.

A transmission direction in a slot/symbol designated as "flexible" through (UE common/UE specific) RRC signaling can be dynamically changed by DCI format 2_0, and PDCCH monitoring is not performed in a slot/symbol designated as UL by RRC and DCI format 2_0.

In NR, resources for which PDCCH monitoring is not performed may be generated by various factors as well as the SFI described above. In the present disclosure, a case in which WUS monitoring is difficult is defined, and a WUS monitoring method and coping method are proposed for each case.

<Cases where WUS Monitoring is Difficult>

Cases that may occur between SFI and WUS monitoring and cases where WUS monitoring is limited due to factors other than SFI are described. Below, the WUS monitoring occasion may be indicated to the connected mode UE in advance (by an offset method/search space set (SS set) setting, etc.). Also, in the present disclosure, the monitoring occasion may include a frequency resource as well as a time resource for performing WUS monitoring. For example, when a CORESET for WUS monitoring is indicated, the WUS monitoring occasion is a time domain resource such as slot/symbol(s) for monitoring the WUS CORESET as well as a frequency domain resource of the corresponding CORESET which may also fall into the category of monitoring occasion. That is, in the present disclosure, resources (e.g., a CORESET and a starting position of the CORESET)

required for the UE to configure a search space for WUS monitoring may be regarded as a WUS monitoring occasion.

Case 1) SFI and WUS Monitoring Occasions

As described above, the SFI may be configured by (UE common/UE specific) RRC signaling and/or DCI format 2_0. For example, the UE may know whether basic UL/DL/flexible for each slot/symbol by cell-specific RRC signaling (TDD-UL-DL-configurationCommon). In addition, by means of UE-specific RRC signaling (TDD-UL-DL-ConfigDedicated), it may be indicated whether UL/DL/flexible for a resource defined as "flexible" in the cell-specific RRC signaling. Thereafter, the UE may be additionally instructed whether UL/DL/flexible through DCI format 2_0 for a resource indicated as "flexible" by RRC signaling (cell-specific & UE-specific RRC signaling). In general, the UE may perform PDCCH monitoring in a resource indicated by downlink (DL) by RRC signaling and/or DCI. In addition, if flexible is indicated by RRC signaling, but additional DCI is not received, PDCCH monitoring may be performed even on the indicated flexible resource.

Whether UL/DL/flexible for each symbol in one slot is defined as a slot format, for example, as shown in the following table.

TABLE 7

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | D | D | F | U | U |
| 32 | D | D | D | D | D | D | D | D | D | D | F | F | U | U |
| 33 | D | D | D | D | D | D | D | D | D | F | F | F | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | D | F | F | F | F | U |
| 44 | D | D | D | D | D | D | F | F | F | F | F | F | U | U |
| 45 | D | D | D | D | D | D | F | F | U | U | U | U | U | U |
| 46 | D | D | D | D | D | F | U | D | D | D | D | D | F | U |
| 47 | D | D | F | U | U | U | U | D | D | F | U | U | U | U |
| 48 | D | F | U | U | U | U | U | D | F | U | U | U | U | U |
| 49 | D | D | D | D | F | F | U | D | D | D | D | F | F | U |
| 50 | D | D | F | F | U | U | U | D | D | F | F | U | U | U |
| 51 | D | F | F | U | U | U | U | D | F | F | U | U | U | U |
| 52 | D | F | F | F | F | F | U | D | F | F | F | F | F | U |
| 53 | D | D | F | F | F | F | U | D | D | F | F | F | F | U |
| 54 | F | F | F | F | F | F | F | D | D | D | D | D | D | D |
| 55 | D | D | F | F | F | U | U | U | D | D | D | D | D | D |
| 56-254 | Reserved | | | | | | | | | | | | | |
| 255 | UE determines the slot format for the slot based on TDD-UL-DL-ConfigurationCommon, or TDD-UL-DL-ConfigDedicated and, if any, on detected DCI formats. | | | | | | | | | | | | | |

The network may define a slot format combination based on the slot format defined as shown in the table above. The slot format combination may consist of slot formats corresponding to the number of slots indicated by the corresponding combination. In this case, the maximum number of slots that one slot format combination can have may be, for example, 512 slots. In the present disclosure, the number of slots indicated by each slot format combination may be defined as an effective period of the corresponding slot format combination.

In the cases below, if even one of the symbols included in the WUS monitoring occasion is indicated as the uplink (by RRC and/or DCI), the corresponding WUS monitoring occasion may be interpreted as overlapping with the uplink (or indicated as the uplink). On the other hand, in the case of downlink, only when all symbols included in the WUS monitoring occasion are indicated as the downlink, it may be assumed that the corresponding WUS monitoring occasion is indicated as the downlink.

Case 1-1) A case that the validity period of the previously received SFI DCI (e.g., DCI format 2_0) is maintained until the next DRX-on duration (or WUS monitoring occasion associated with the next DRX-on duration), and the WUS monitoring occasion is indicated as downlink (by RRC signaling and/or DCI 2_0).

Case 1-2) A case that the validity period of the previously received SFI DCI is maintained until the next DRX-on duration (or WUS monitoring occasion linked to the next DRX-on duration), and the WUS monitoring occasion is indicated as the uplink (by RRC signaling and/or DCI 2_0).

Case 1-3) A case that the validity period of the previously received SFI DCI ends in the DRX OFF duration (or ends before the WUS monitoring occasion) and the WUS monitoring occasion is semi-static (i.e., indicated by RRC signaling) downlink (DL).

Case 1-4) A case that the validity period of the previously received SFI DCI ends in the DRX off duration (or ends before the WUS monitoring occasion) and the WUS monitoring occasion is semi-static (i.e., indicated by RRC signaling) uplink (UL).

Case 1-5) A case that the validity period of the previously received SFI DCI ends in the DRX off duration (or ends before the WUS monitoring occasion) and the WUS monitoring occasion is semi-static (i.e., indicated by RRC signaling) flexible.

Case 1-6) A case that the validity period of the previously received SFI DCI is maintained until the next DRX-on duration (or WUS monitoring occasion associated with the next DRX-on duration), and the WUS monitoring occasion is semi-static flexible and also indicated as flexible by DCI (in a resource that is currently semi-static flexible and also flexible by the DCI, the UE does not perform PDCCH monitoring).

Case 2) a Case that the WUS Monitoring Occasion Overlaps the SSB Indicated by the Network.

The operation for case 2 may be as follows. As can be seen from the following contents, when the SSB position indicated by the network overlaps the PDCCH monitoring occasion, the UE does not perform monitoring of the corresponding PDCCH candidate if there is a resource overlapping the SSB resource among the resource elements in the PDCCH candidate.

Specifically, in monitoring the PDCCH candidate in the slot, if i) 'ssb-PositionsInBurst' is received in system information block 1 (SIB1), ii) 'ssb-PositionsInBurst' is not received in 'ServingCellConfigCommon' for the serving cell, iii) PDCCH candidate is not monitored in Type0-PDCCH CSS set, and iv) at least one resource element for the PDCCH candidate overlaps at least one resource element corresponding to the SS/PBCH block index provided by 'ssb-PositionsInBurst' in SIB1, the UE does not need to monitor the PDCCH candidate.

And, if i) 'ssb-PositionsInBurst' is received in 'ServingCellConfigCommon' for the serving cell, ii) PDCCH candidate is not monitored in the Type0-PDCCH CSS set, and iii) at least one resource element for the PDCCH candidate overlaps at least one resource element corresponding to the SS/PBCH block index provided by 'ssb-PositionsInBurst' in SIB1, the UE does not need to monitor the PDCCH candidate.

Case 3) a Case that the WUS Monitoring Occasion Overlaps the LTE Cell-Specific Reference Signal (CRS) Resource (Lte-CRS-ToMatchAround) Indicated by the Network.

When the LTE CRS resource indicated by the network overlap the PDCCH monitoring occasion, the UE does not monitor the corresponding PDCCH candidate if there is a resource overlapping the LTE CRS resource among the resource elements in the PDCCH candidate.

That is, in the monitoring of the PDCCH candidate in the slot, when at least one resource element of the PDCCH candidate on the serving cell overlaps at least one resource element of 'lte-CRS-ToMatchAround', the UE does not need to monitor the PDCCH candidate.

<WUS Monitoring>

Hereinafter, methods for monitoring WUS and/or determining whether to wake up in the above-listed cases (Case 1 and sub-cases, Case 2, Case 3, etc.) are proposed.

Each of the methods below may be applied to each case (or each sub-case), or one method may be applied to a plurality of cases. And the network may indicate a case applied to all or part of the method below through higher layer signaling or the like. Also, the following methods may be implemented alone or in combination.

In addition, the methods below may be applied to a case in which the UE cannot perform WUS monitoring other than the cases listed above. That is, when a valid WUS monitoring occasion has been configured, but WUS monitoring cannot be performed or WUS monitoring is not required for various reasons (e.g., overlapping with resources allocated for other purposes occurs) in the valid WUS monitoring occasion, at least one of the methods described below may be applied. Hereinafter, the case where the UE cannot perform WUS monitoring may mean that the PDCCH monitoring for WUS (DCI format 2_6) detection is not required for the UE. WUS (DCI format 2_6) detection is not required for the UE.

Method 1) Skip of WUS Monitoring and PDCCH Monitoring

In order to increase the power saving gain, when WUS cannot be monitored as in the above cases (e.g., when some or all of the time domain resources of the WUS monitoring occasion are indicated as uplink use), i) monitoring of the corresponding WUS and ii) monitoring of the PDCCH in the DRX cycle associated with the corresponding WUS may all be skipped. The network may instruct method 1 to be applied to a UE with a small amount of scheduled or expected traffic. The UE receiving the corresponding instruction may determine whether WUS monitoring is possible (whether the resource is a resource through which the WUS can be transmitted) based on the previously instructed UL/DL setting, SSB setting, LTE CRS setting, and the like. When a WUS monitoring occasion is set in a resource where the WUS cannot be transmitted, the sleep state may be maintained without performing PDCCH monitoring in the corresponding WUS and in the DRX cycle associated with the WUS.

Figure 16:
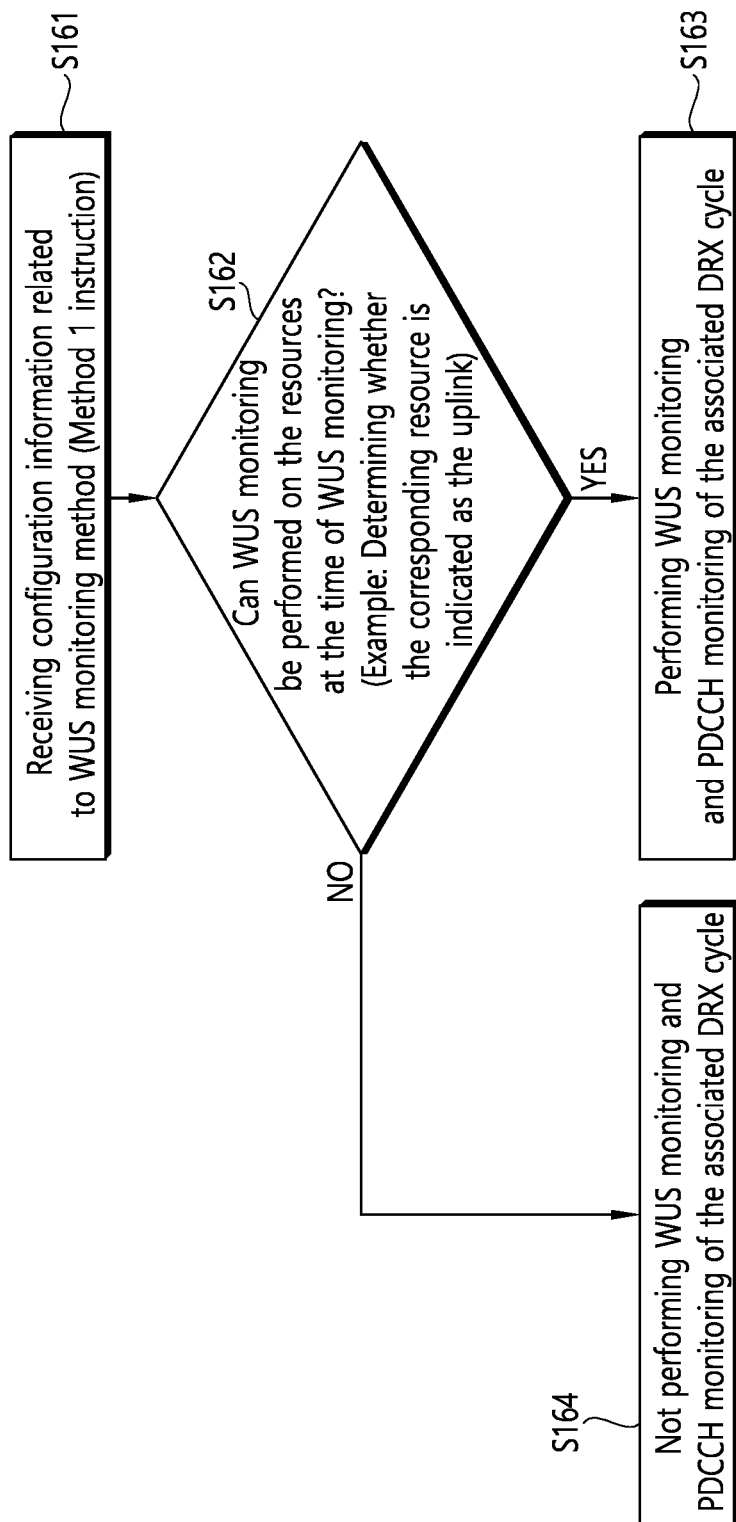
FIG. 16 shows an application example of method 1.

FIG. 16 shows an application example of method 1.

Referring to FIG. 16, the UE receives configuration information related to the WUS monitoring method (S161). The configuration information may indicate, for example, method 1 described above. The UE determines whether WUS monitoring can be performed on the resources at the scheduled time of WUS monitoring (S162). For example, it may be determined whether the corresponding resource is indicated as the uplink by the above-mentioned higher layer signal.

If it is determined that WUS monitoring can be performed on the resources at the scheduled time of WUS monitoring, the UE performs WUS monitoring and PDCCH monitoring of the associated DRX cycle (S163).

If it is determined that WUS monitoring cannot be performed on the resources at the scheduled time of WUS monitoring, the UE does not perform WUS monitoring and PDCCH monitoring of the associated DRX cycle (S164).

Method 2) a Method in which the UE Wakes Up when the WUS Cannot be Transmitted at the Monitoring Occasion.

Method 2 may be used for the purpose of preventing delay increase due to PDCCH monitoring skip. If a WUS monitoring occasion is set in a region where WUS cannot be transmitted (or a resource area in which the UE is not required to monitor WUS) (by the instruction of the network or by definition in advance), the UE may perform PDCCH monitoring in the on-duration of the DRX cycle associated with the WUS without monitoring the WUS. Although the network performs a power saving operation, PDCCH monitoring may be induced through method 2 for a UE expected to transmit/receive data.

Figure 17:
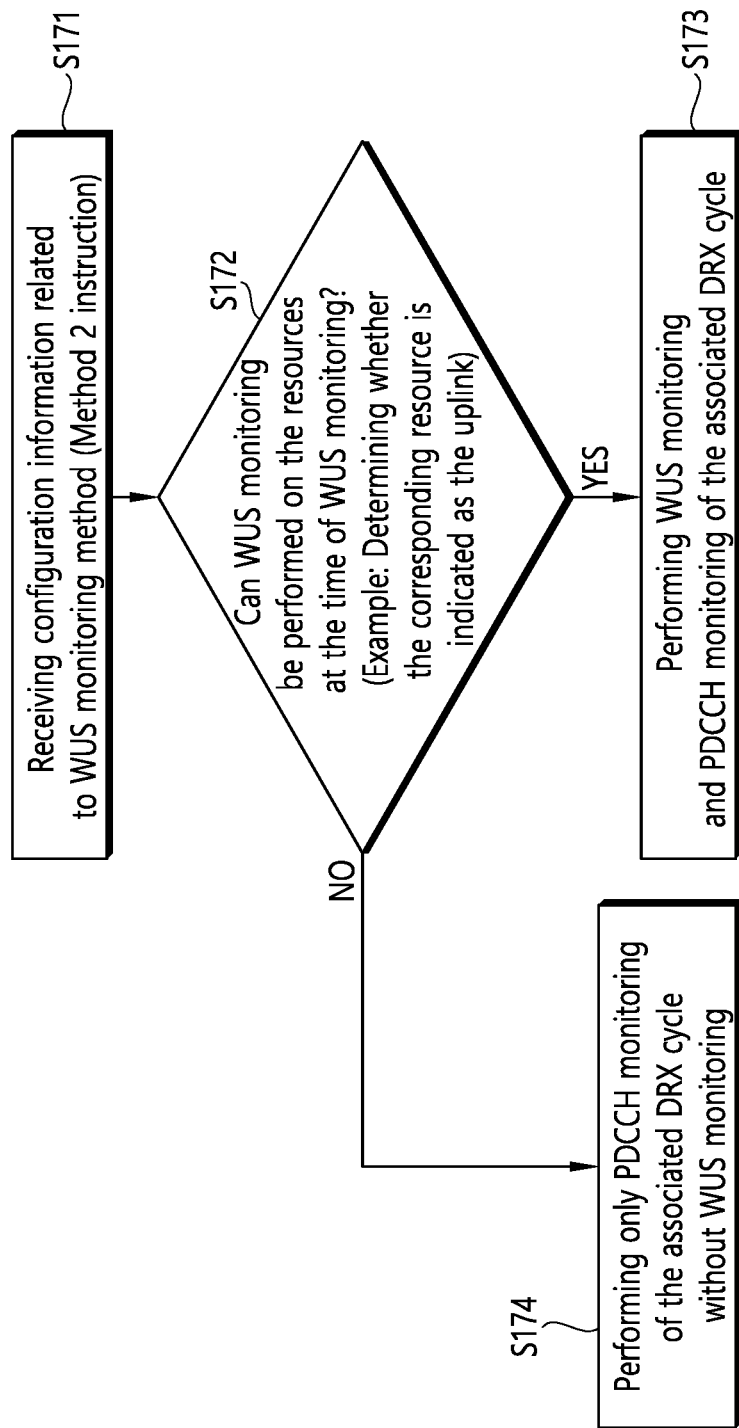
FIG. 17 shows an application example of method 2.

FIG. 17 shows an application example of method 2.

Referring to FIG. 17, the UE receives configuration information related to the WUS monitoring method (S171). The configuration information may indicate, for example, method 2 described above. The UE determines whether WUS monitoring can be performed on the resources at the scheduled time of WUS monitoring (S172). For example, it may be determined whether the corresponding resource is indicated as the uplink by the above-mentioned higher layer signal.

If it is determined that WUS monitoring can be performed on the resources at the scheduled time of WUS monitoring, the UE performs WUS monitoring and PDCCH monitoring in the associated DRX cycle (S173).

If it is determined that WUS monitoring cannot be performed on the resources at the scheduled time of WUS monitoring, the UE does not perform WUS monitoring and may only perform PDCCH monitoring in the associated DRX cycle (S174). In FIG. 16, when it is determined that WUS monitoring cannot be performed on the resources at the scheduled time of WUS monitoring, neither WUS monitoring nor PDCCH monitoring in the associated DRX cycle is performed, but in FIG. 17, in this case, there is a difference in that WUS monitoring is not performed and only PDCCH monitoring in the associated DRX cycle is performed.

Figure 18:
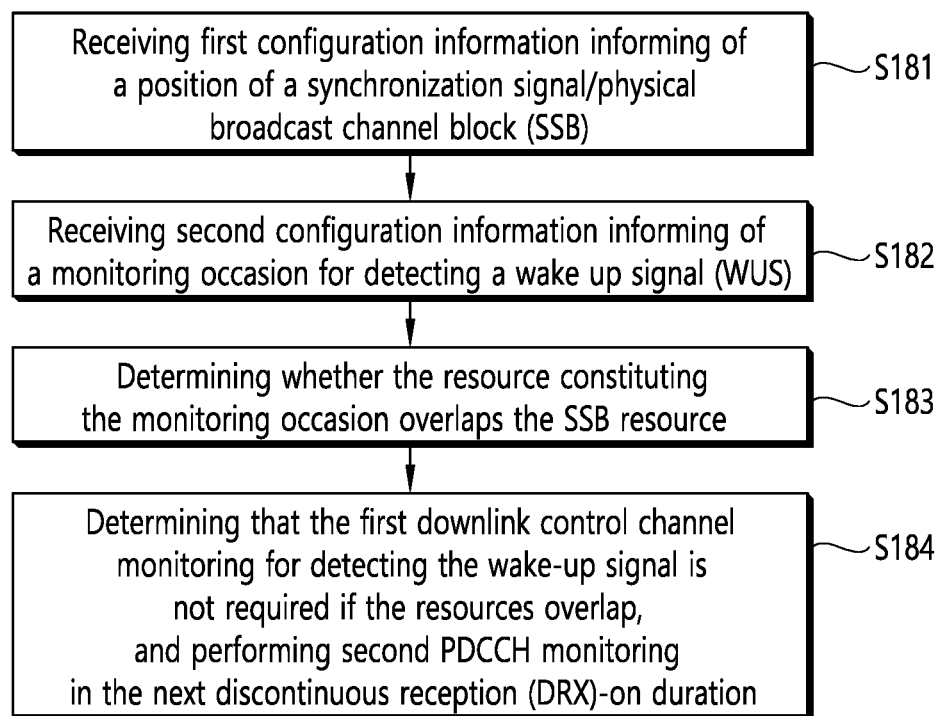
FIG. 18 illustrates a method for monitoring a PDCCH of a UE in a wireless communication system.

FIG. 18 illustrates a method for monitoring a physical downlink control channel (PDCCH) of a UE in a wireless communication system.

Referring to FIG. 18, the UE receives first configuration information informing of a position of a synchronization signal/physical broadcast channel block (SSB) (S181).

For example, the UE may receive 'ssb-PositionsInBurst' (corresponding to the first configuration information) through the system information block 1 (SIB1). The first configuration information may indicate, for example, the position of the time domain of the SSB transmitted within a half frame. Alternatively, the UE may receive the first configuration information through an RRC message used to configure cell-specific parameters of a serving cell of the UE (let's call this 'ServingCellConfigCommon').

The UE receives second configuration information informing of a monitoring occasion for detecting a wake up signal (WUS) (S182). Here, the wake-up signal may be, for example, first downlink control information (DCI) including a wake-up indication. The first DCI may be, for example, DCI format 2_6. The monitoring occasion may be located within a predetermined time from the start time of the next DRX-on duration. This may mean that the monitoring occasion is a valid monitoring occasion in terms of time. This has been described in detail with reference to FIG. 15. The second configuration information may be included in a message for setting the aforementioned search space (set). For example, the monitoring occasion may be defined by 'monitoringSlotPeriodicityAndOffset', 'duration', etc. included in a message for setting a search space (set).

The UE determines whether the resource constituting the monitoring occasion overlaps the SSB resource (S183). This may mean determining whether it is possible to monitor the first PDCCH for detecting the wake-up signal at the monitoring occasion (whether it is an exceptional situation in which it is difficult to monitor the first PDCCH). The exceptional situation may be predefined. For example, if the resource constituting the monitoring occasion and the resource to be used for receiving an essential signal such as SSB overlap, it is necessary to receive the SSB rather than monitoring the PDCCH at the monitoring occasion, so it can be determined that monitoring the PDCCH is difficult. (This may express that PDCCH monitoring is not required in the monitoring occasion).

In the case where the monitoring occasion and the SSB resource overlap, if even one of the resource elements constituting the monitoring occasion overlaps the resource element of the SSB, it can be determined that the first PDCCH monitoring is not required in the monitoring occasion.

For the overlap of the monitoring occasion and the SSB resource, the aforementioned case 2 may be referred to.

When the first PDCCH monitoring for detecting the wake-up signal is not required at the monitoring occasion, the UE performs a second PDCCH monitoring in the next discontinuous reception (DRX)-on duration (S184). After waking up, the UE may perform PDCCH monitoring for all configured search space sets. The second PDCCH monitoring may be PDCCH monitoring for detecting a second DCI other than the first DCI. The second DCI may be, for example, general scheduling information such as DCI format 0 and DCI format 1 (other DCIs other than the first DCI). If the first PDCCH monitoring for detecting the wake-up signal is not required at the monitoring occasion, the UE does not perform the first PDCCH monitoring at the monitoring occasion. That is, as in the above-mentioned method 2, when the WUS occasion is set in an area where WUS cannot be transmitted (or a resource area in which the UE is not required to monitor DCI), the UE does not perform WUS monitoring (first PDCCH monitoring) but does perform the second PDCCH monitoring in the on-duration of the DRX cycle associated with the corresponding WUS.

In addition, a plurality of monitoring occasions may be set. In this case, if the first PDCCH monitoring for detecting the wake-up signal is not required in all of the plurality of monitoring occasions, the second PDCCH monitoring may be performed in the next discontinuous reception (DRX)-on duration. That is, for all of the plurality of (valid) monitoring occasions (For example, monitoring occasions located in front of the next DRX-on duration, and located in a predetermined time from the DRX-on duration (the predetermined time may be set by the network or predefined)) configured from the network, if at least one resource element of the each of the plurality of monitoring occasions overlaps with the SSB resources and the first PDCCH monitoring cannot be performed as a result, the second PDCCH monitoring may be performed in the next DRX-on duration.

For example, the monitoring occasion may be provided as two monitoring occasions, such as a first monitoring occasion and a second monitoring occasion. In this case, if even one of the resource elements constituting the first monitoring occasion overlaps the SSB resource element, the first PDCCH monitoring is not required in the first monitoring occasion, and if even one of the resource elements constituting the second monitoring occasion overlaps the SSB resource element, the first PDCCH monitoring is not required in the second monitoring occasion. As such, if the first PDCCH monitoring is not required in all of the plurality of monitoring occasions, the UE may perform the second PDCCH monitoring in the next DRX-on duration.

Figure 19:
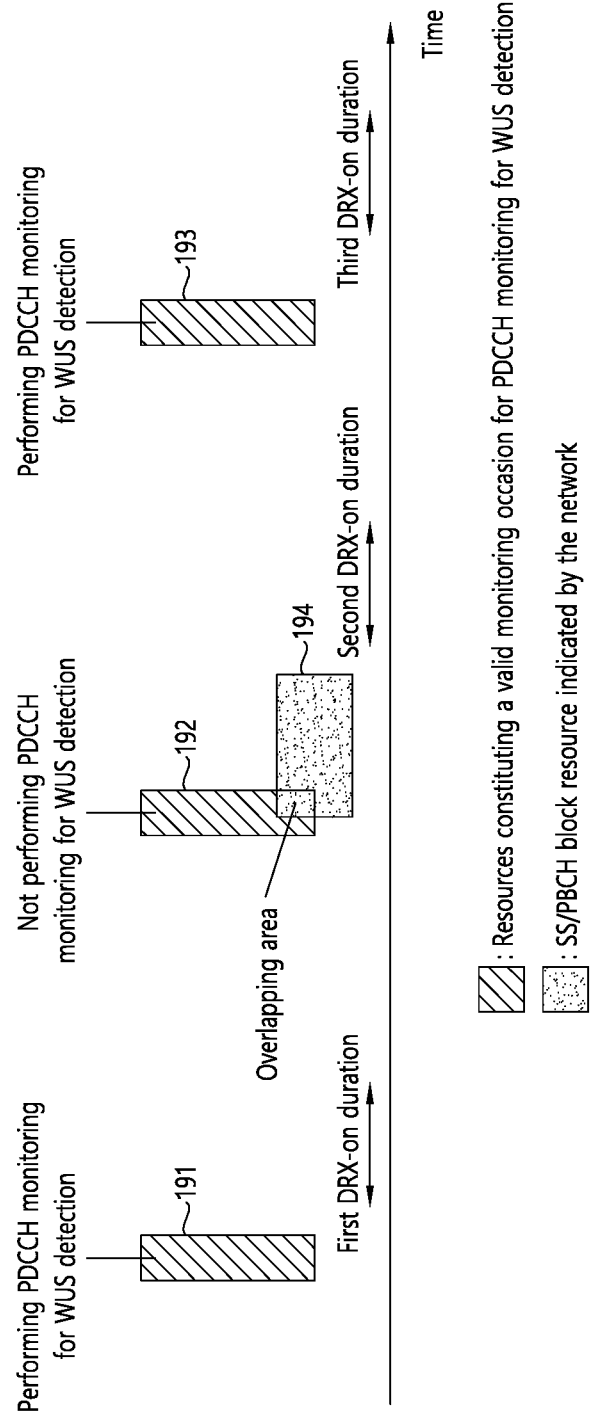
FIG. 19 illustrates the overlap of WUS monitoring occasions and SSB resources.

FIG. 19 illustrates the overlap of WUS monitoring occasions and SSB resources.

Referring to FIG. 19, WUS monitoring occasions 191, 192, and 193 may be configured for the UE. For example, WUS monitoring occasions may be set/instructed through a message for setting the aforementioned search space (set).

In addition, an SS/PBCH block (SSB) resource 194 may be configured for the UE. For example, the UE may be configured with/instructed on the SSB resource through system information (ssb-PositionsInBurst in SIB1) or through common configuration information for a serving cell (ssb-PositionsInBurst in ServingCellConfigCommon).

At this time, a portion overlapping with the SSB resource 194 may occur in a specific WUS monitoring occasion, for example, the WUS monitoring occasion 192 located before the second DRX-on duration. In this case, the UE does not perform PDCCH monitoring for WUS detection at the WUS monitoring occasion 192. And, in the second DRX on-duration, PDCCH monitoring for detecting a general DCI format other than WUS is performed. On the other hand, PDCCH monitoring for WUS detection is performed at other WUS monitoring occasions 191 and 193 in which the portion overlapping with the SSB resource 194 does not occur. And depending on the result, it may be determined whether to perform PDCCH monitoring in the corresponding DRX on-duration.

In FIG. 19, the case where there is one WUS monitoring occasion before the second DRX-on duration and the WUS monitoring occasion overlaps with the SSB resource is exemplified, but this is not a limitation. That is, there may be a plurality of WUS monitoring occasions before the second DRX on duration, and overlap with at least one of an uplink resource, an SSB resource, and an LTE CRS resource may occur in all of the plurality of WUS monitoring occasions. In this case, the UE does not perform PDCCH monitoring for WUS detection in the plurality of WUS monitoring occasions, but performs PDCCH monitoring for general DCI format detection other than WUS in the second DRX on-duration.

Figure 20:
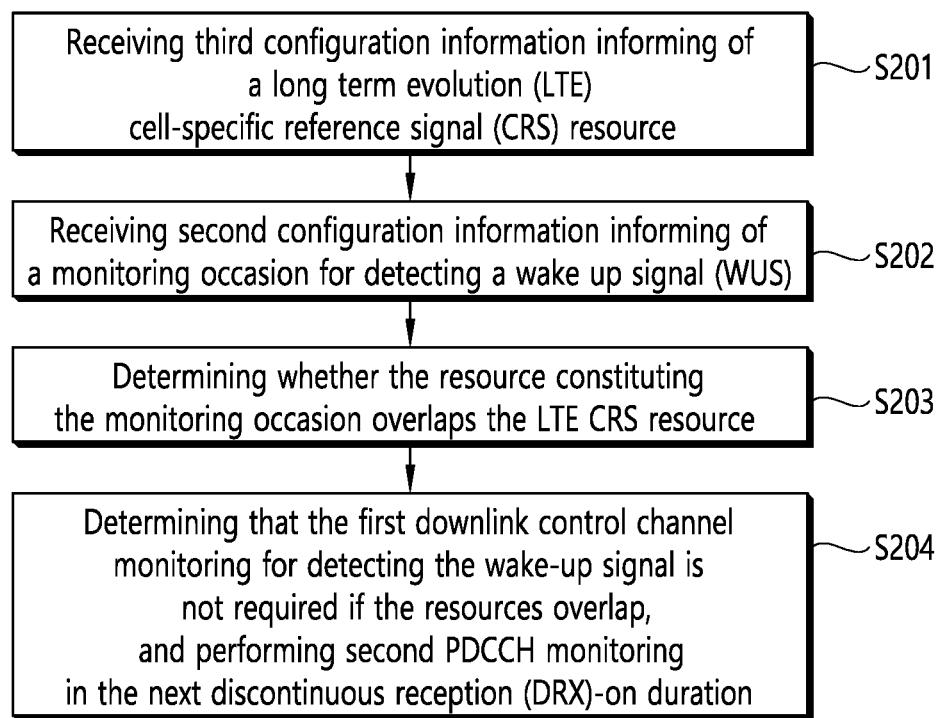
FIG. 20 is another example of a PDCCH monitoring method of a UE in a wireless communication system.

FIG. 20 is another example of a PDCCH monitoring method of a UE in a wireless communication system.

Referring to FIG. 20, the UE receives configuration information (this will be referred to as third configuration information for convenience of description) informing of a long term evolution (LTE) cell-specific reference signal (CRS) resource (S201).

For example, UE may receive the third configuration information through an RRC message used to set the cell-specific parameters of the serving cell (let's call it 'ServingCellConfigCommon') or an RRC message used to add/modify/configure a serving cell to the UE ('ServingCellConfig').

The UE receives second configuration information informing of a monitoring occasion for detecting a wake up signal (WUS) (S202). Here, the wake-up signal may be, for example, first downlink control information (DCI) including a wake-up indication. The first DCI may be, for example, DCI format 2_6. The monitoring occasion may be located within a predetermined time from the start time of the next DRX-on duration. This may mean that the monitoring occasion is a valid monitoring occasion in terms of time. This has been described in detail with reference to FIG. 15. The second configuration information may be included in a message for setting the aforementioned search space (set). For example, the monitoring occasion may be defined by 'monitoringSlotPeriodicityAndOffset', 'duration', etc. included in a message for setting a search space (set).

The UE determines whether the resource constituting the monitoring occasion overlaps the LTE CRS resource (S203). This may mean determining whether it is possible to monitor the first PDCCH for detecting the wake-up signal at the monitoring occasion (whether it is an exceptional situation in which it is difficult to monitor the first PDCCH). The exceptional situation may be predefined. For example, if the resource constituting the monitoring occasion and the LTE CRS resource overlap, it may be determined that PDCCH monitoring is difficult in the monitoring occasion (It may be expressed that PDCCH monitoring is not required in the monitoring occasion). That is, if the resource constituting the monitoring occasion overlaps with a long term evolution (LTE) cell specific reference signal (CRS) resource indicated by the network, the first PDCCH monitoring may not be required in the monitoring occasion (see Case 3 above).

In that the monitoring occasion and the LTE CRS resource overlap, for example, if even one of the resource elements constituting the monitoring occasion overlaps the resource element of the LTE CRS, it may be determined that the first PDCCH monitoring is not required in the monitoring occasion.

If the UE determines that the first PDCCH monitoring for detecting the wake-up signal is not required in the monitoring occasion because the resources constituting the monitoring occasion and the LTE CRS resource overlap, the UE performs a second PDCCH monitoring in the next discontinuous reception (DRX)-on duration (S204).

After waking up, the UE may perform PDCCH monitoring for all configured search space sets. The second PDCCH monitoring may be PDCCH monitoring for detecting a second DCI other than the first DCI. The second DCI may be, for example, general scheduling information such as DCI format 0 and DCI format 1 (other DCIs other than the first DCI). If the first PDCCH monitoring for detecting the wake-up signal is not required at the monitoring occasion, the UE does not perform the first PDCCH monitoring at the monitoring occasion. That is, when the WUS occasion is set in an area in which WUS cannot be transmitted (or a resource area in which the UE is not required to monitor DCI) as in the above-described method 2, the UE does not perform WUS monitoring (first PDCCH monitoring), but may perform second PDCCH monitoring in the on-duration of the DRX cycle associated with the WUS.

In addition, a plurality of monitoring occasions may be set. In this case, if the first PDCCH monitoring for detecting the wake-up signal is not required in all of the plurality of monitoring occasions, the UE may perform the second PDCCH monitoring in the next discontinuous reception (DRX)-on duration. That is, regarding all of the plurality of (valid) monitoring occasions configured from the network (For example, monitoring occasions located in front of the next DRX-on duration, but located within a predetermined time (the predetermined time may be set by the network or may be predetermined) from the DRX-on duration), in the case where the first PDCCH monitoring cannot be performed due to overlap with the LTE CRS resource even in at least one resource element, respectively, the second PDCCH monitoring may be performed in the next DRX-on duration. For example, the monitoring occasion may be provided as two monitoring occasions, such as a first monitoring occasion and a second monitoring occasion. In this case, if even one of the resource elements constituting the first monitoring occasion overlaps the LTE CRS resource element, the first PDCCH monitoring is not required in the first monitoring occasion. And if even one of the resource elements constituting the second monitoring occasion overlaps the LTE CRS resource element, the first PDCCH monitoring is not required in the second monitoring occasion. As such, if the first PDCCH monitoring is not required in all of the plurality of monitoring occasions, the UE may perform the second PDCCH monitoring in the next DRX-on duration.

Figure 21:
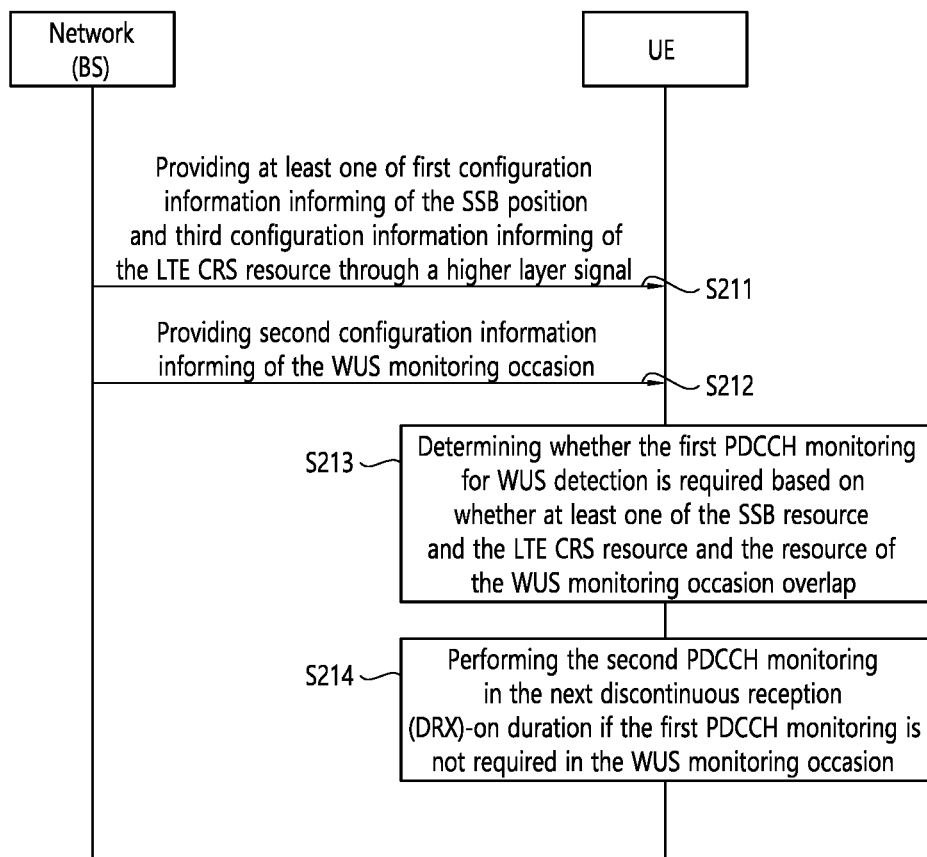
FIG. 21 is an example of a signaling method between a network (base station) and a UE.

FIG. 21 is an example of a signaling method between a network (base station) and a UE.

Referring to FIG. 21, the network provides at least one of first configuration information informing the UE of the SSB position and third configuration information informing of the LTE CRS resource through a higher layer signal (S211). In addition, the network provides second configuration information informing the UE of the WUS monitoring occasion (S212).

The UE determines whether the first PDCCH monitoring for WUS detection is required based on whether at least one of the SSB resource and the LTE CRS resource and the resource of the WUS monitoring occasion overlap (S213). For example, if the resource constituting the WUS monitoring occasion overlaps the SSB resource and/or the LTE CRS resource in at least one resource element, it may be determined that the first PDCCH monitoring is not required.

If the first PDCCH monitoring for detecting the wake-up signal is not required in the WUS monitoring occasion, the second PDCCH monitoring is performed in the next discontinuous reception (DRX)-on duration (S214). That is, after the UE wakes up, the second PDCCH monitoring may be performed on all search space sets configured in the next DRX on-duration. The second PDCCH monitoring may be PDCCH monitoring for detecting a DCI format other than WUS (DCI format 2_6). From a timer perspective, if the first PDCCH monitoring for detecting the wake-up signal is not required at the WUS monitoring occasion, it can be expressed as starting 'drx-onDurationTimer' for the next (next) discontinuous reception (DRX) cycle.

As a result of the second PDCCH monitoring, when a DCI format including downlink scheduling information is detected, a corresponding downlink signal reception is performed, and when a DCI format including the uplink scheduling information is detected, an uplink signal transmission is performed accordingly. When a DCI format including information having other purposes (e.g., power control) is detected, a corresponding operation is performed accordingly.

Meanwhile, in NR, a maximum of 10 search space sets may be set for one active bandwidth part (BWP). This has a purpose to monitor various transmission schemes and PDCCHs for different purposes and this may mean that it is not necessary to perform monitoring of all set search space sets when the UE wakes up. Therefore, method 2 can be classified as the following methods. The following methods may be implemented alone or in combination. Additionally, the network may select one of the following methods and instruct the UE (via higher layer signaling, etc.).

In addition, when method 2 is applied, in order to reduce unnecessary PDCCH monitoring, it may be predefined or instructed by the network to wake up only for a shorter period than the on-duration configuration in the DRX configuration. For example, a time duration for monitoring the search space set after waking up (or the number of monitoring per search space set, etc.) by method 2 may be predefined or may be indicated by the network.

Method 2-1) Perform monitoring on all of the configured search space sets after wakeup.

Method 2-1 has the advantage of being able to operate without additional signaling overhead, it may be useful when the data type (e.g., cell information, UE-specific information) transmitted to the UE is difficult to predict.

Method 2-2) When waking up by method 2, a method of monitoring only a predefined or network-directed search space set.

Method 2-2 may be effective in reducing complexity due to PDCCH monitoring after wakeup. As an example, when method 2 is applied, the UE may be defined to only monitor the search space set indicated to monitor the fallback DCI after waking up. As another method, when method 2 is applied by the network, that is, when waking up without WUS monitoring, a search space set to perform PDCCH monitoring may be indicated (through higher layer signaling, etc.).

Method 3) Multiple Monitoring Occasions for One (or More) DRX Cycle.

The network may designate a number of WUS monitoring occasions associated with a specific DRX cycle (or multiple DRX cycles in which wake-up is determined with one WUS). At this time, the UE may skip WUS monitoring at a monitoring occasion in which WUS cannot be transmitted due to TDD UL/DL configuration, SSB, and LTE CRS.

Method 4) How to Monitor WUS in Another Available Monitoring Occasion.

If it is difficult to transmit WUS in a WUS monitoring occasion associated with a specific DRX cycle (or multiple DRX cycles in which wakeup is determined with one WUS), the UE may perform WUS monitoring at the next-order WUS monitoring occasion defined in advance or indicated by the network. For this, the following method may be considered.

Method 4-1) Multiple occasions are configured for WUS, but the UE may perform WUS monitoring only at one (available) monitoring occasion with the highest priority.

The network may set up multiple WUS monitoring occasions for the method 4-1, and configure a priority for each occasion. And when WUS cannot be transmitted at a higher priority monitoring occasion, WUS monitoring is performed at the next priority monitoring occasion. For example, the network may designate a monitoring occasion in consecutive slots separated by a certain time from the associated (DRX) on-duration, the UE may perform WUS monitoring at the closest monitoring occasion from the associated on duration. If the WUS cannot be transmitted at the corresponding monitoring occasion, the UE may perform WUS monitoring at the next nearest monitoring occasion.

Method 4-2) Define the method for deriving the second monitoring occasion.

When the WUS transmission is difficult in the monitoring occasion indicated by the network, a method for determining the next occasion may be predefined or may be indicated by the network. For example, if WUS cannot be transmitted at the monitoring occasion indicated by the network, the UE may perform WUS monitoring assuming that the same CORESET exists in the previous slot (X slot(s)) of the corresponding slot.

Alternatively, a symbol level shift within a slot may be considered. For example, when a three-symbol CORESET is indicated for WUS monitoring and the first symbol of the CORESET is designated as UL, the corresponding CORESET may be applied with a delay of one symbol. In the above example, the symbol level shift and the slot level shift may be applied together. For example, when applying the symbol level shift, if the CORESET is located across two consecutive slots, the symbol level shift may be canceled and the slot level shift may be applied.

Method 5) Rate Matching or Puncturing

If some resources of the CORESET indicated for WUS monitoring cannot be used for WUS transmission for reasons such as transmission direction, SSB, LTE CRS, etc., rate matching or puncturing for a corresponding resource may be considered. For example, when the WUS monitoring occasion and the LTE CRS resource overlap, rate matching for the resource directly overlapping with the LTE CRS may be considered. This has the advantage of reducing the overhead required for setting up additional monitoring occasions. In addition, when the transmission direction of some symbols in the CORESET for monitoring WUS is indicated as the UL, the UE may perform rate matching (or puncturing) on the corresponding symbol or change the CORESET duration. For example, when the first symbol of the 3-symbol CORESET is indicated as UL, the duration of the corresponding CORESET in the corresponding slot may be changed to 2 and applied. This has an advantage in that the coding rate can be maintained compared to the case where rate matching (or puncturing) is applied.

SPECIFIC EXAMPLES

As suggested above, the WUS monitoring method for each case may be defined in advance (by case (set)) or may be instructed by the network.

For example, in cases 1-1 and 1-3, since the WUS monitoring occasion is indicated as DL, there is no problem in WUS transmission and reception. Accordingly, in the cases, WUS monitoring can be performed according to the instructed WUS setting.

As another example, in cases 1-2 and 1-4, WUS transmission/reception may be difficult because the WUS monitoring occasion overlaps with a resource configured for uplink (UL). In this case, all methods proposed in the present disclosure are applicable. As an example, in the cases, method 2 may be applied to skip WUS monitoring, and PDCCH monitoring for a preset search space set may be performed in the on duration(s) associated with the corresponding WUS monitoring occasion.

On the other hand, if it is expected that there will be little data transmission/reception for the UE, method 1 is applied, the corresponding WUS monitoring is skipped, and PDCCH monitoring in the on duration(s) associated with the corresponding WUS monitoring occasion is not performed. Similarly, a monitoring occasion to replace the corresponding monitoring occasion may be set by methods 3, 4, and the like.

As another example, in the case 1-5, it may be a case in which it is uncertain whether WUS transmission/reception is possible. The UE can perform PDCCH monitoring because the transmission direction of the corresponding slot is indicated by the network to be flexible, but it is not known whether the reason for not detecting the WUS is that there is no data to be transmitted to the corresponding UE or that the corresponding resource is used for the uplink purpose. If the WUS cannot be transmitted because the resource of the WUS monitoring occasion is used for the uplink purpose, this may cause an increase in the delay of the corresponding UE, and thus a clearer WUS monitoring occasion may be required. Therefore, in case 1-5, it may be preferable to always perform PDCCH monitoring as in methods 2, 3, and 4, or to perform WUS monitoring at a more reliable monitoring occasion. In case 1-6, semi-static flexible and resources indicated as flexible by DCI are reserved resources for forward compatibility, and the UE cannot perform PDCCH monitoring on the corresponding resources. Accordingly, an operation such as newly setting a WUS monitoring occasion or performing PDCCH monitoring may be performed through the method proposed in the present disclosure.

In cases 2 and 3, since only some resources of the monitoring occasion may be affected, a method of maintaining the current monitoring occasion through a method such as method 5 may also be considered. Methods 1, 2, 3, and 4 may also be applied to Cases 2 and 3.

<SFI Monitoring in Sleep State>

Some of the above cases may include overlapping situations between WUS monitoring occasions and resources indicated as "flexible". For example, when it is not possible to determine the transmission direction of the resources indicated as "flexible" by RRC signaling because the validity period of the DCI format 2_0 received by the UE has passed and when the UE's WUS monitoring occasion includes the resource, ambiguity in the transmission direction may occur. In order to solve this problem, the present disclosure proposes a method of delivering the SFI of the WUS monitoring occasion. The methods proposed below may be implemented alone or in combination.

The suggestions below may be limited to the case of performing WUS monitoring. In addition, whether the methods below are applied may be determined by the instruction of the network. Additionally, the following proposals may be limitedly applied when the WUS monitoring occasion and the resource indicated as "flexible" by RRC signaling overlap.

Alt 1) a Method of Assuming that the SFI of the Latest DCI Format 2_0 is Maintained.

As a first method, the UE may assume that the most recently received SFI of DCI format 2_0 is maintained for the WUS monitoring occasion. For example, it is assumed that the corresponding slot format combination is repeated again from the time point when the validity period of the most recently received DCI format 2_0 ends, and the SFI in the WUS monitoring occasion can be derived. Afterwards, when the resource of the WUS monitoring occasion is indicated as the uplink (by the corresponding slot format combination), the method proposed above may be applied.

Alt 2) a Method of Monitoring DCI Format 2_0 Before WUS Monitoring.

If the UE is configured to monitor DCI format 2_0, it may monitor DCI format 2_0 at the closest DCI format 2_0 monitoring time before the WUS monitoring occasion. When the validity period of the previously received DCI format 2_0 expires and the UE needs to perform WUS monitoring, the UE monitors DCI format 2_0 at the DCI format 2_0 monitoring occasion closest to the WUS monitoring occasion (even in the sleep state). In this case, when the WUS monitoring occasion is a static DL (indicated by RRC signaling), monitoring for DCI format 2_0 may be skipped.

Alt 3) Slot Format Indication for WUS at the Most Recent Active Time

The network may indicate the slot format of the next WUS monitoring occasion (via higher layer signaling, etc.) at the active time of the UE. The slot format of the next WUS monitoring occasion indicated by the network at the active time may be indicated only when the corresponding monitoring occasion is static "flexible".

Figure 22:
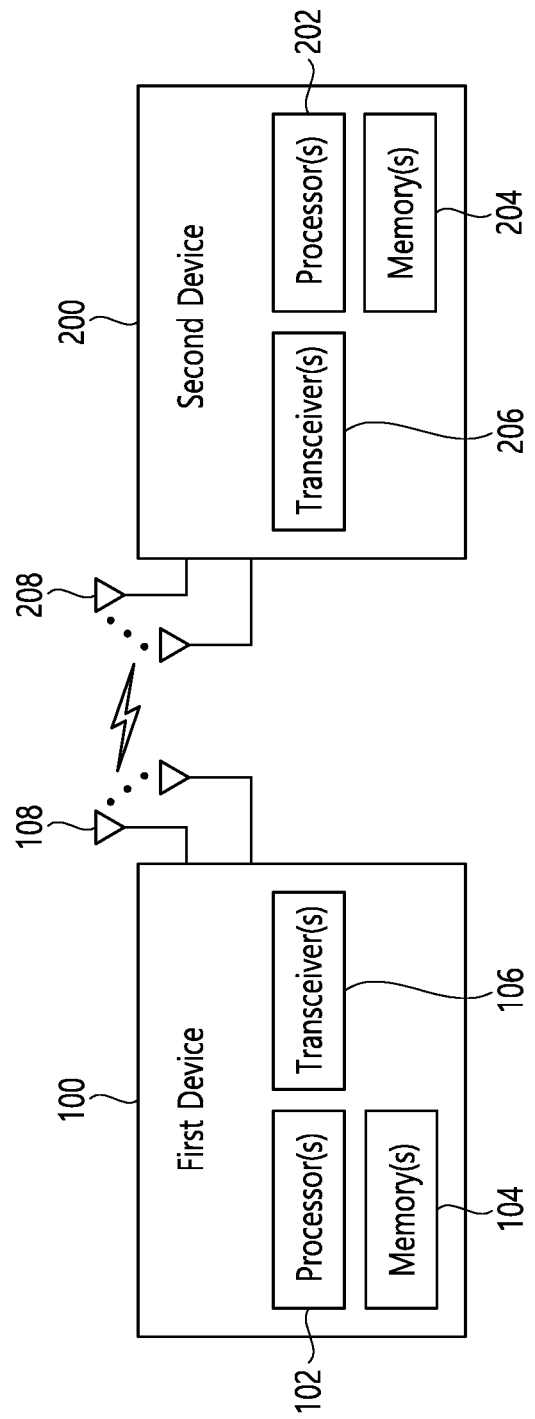
FIG. 22 illustrates a wireless device that is applicable to the disclosure.

FIG. 22 illustrates a wireless device applicable to this specification.

Referring to FIG. 22, the first wireless device 100 and the second wireless device 200 may transmit/receive wireless signals through various wireless access technologies (e.g., LTE, NR).

The first wireless device 100 includes at least one processor 102 and at least one memory 104 and may further include at least one transceiver 106 and/or at least one antenna 108. The processor 102 may be configured to control the memory 104 and/or the transceiver 106 and to implement the descriptions, functions, procedures, proposals, methods, and/or operational flowcharts disclosed herein. For example, the processor 102 may process information in the memory 104 to generate first information/signal and may then transmit a radio signal including the first information/signal through the transceiver 106. In addition, the processor 102 may receive a radio signal including second information/signal through the transceiver 106 and may store information obtained from signal processing of the second information/signal in the memory 104. The memory 104 may be connected to the processor 102 and may store various pieces of information related to the operation of the processor 102. For example, the memory 104 may store a software code including instructions to perform some or all of processes controlled by the processor 102 or to perform the descriptions, functions, procedures, proposals, methods, and/or operational flowcharts disclosed herein. Here, the processor 102 and the memory 104 may be part of a communication modem/circuit/chip designed to implement a radio communication technology (e.g., LTE or NR). The transceiver 106 may be connected with the processor 102 and may transmit and/or receive a radio signal via the at least one antennas 108. The transceiver 106 may include a transmitter and/or a receiver. The transceiver 106 may be replaced with a radio frequency (RF) unit. In this specification, the wireless device may refer to a communication modem/circuit/chip.

The second wireless device 200 includes at least one processor 202 and at least one memory 204 and may further include at least one transceiver 206 and/or at least one antenna 208. The processor 202 may be configured to control the memory 204 and/or the transceiver 206 and to implement the descriptions, functions, procedures, proposals, methods, and/or operational flowcharts disclosed herein. For example, the processor 202 may process information in the memory 204 to generate third information/signal and may then transmit a radio signal including the third information/signal through the transceiver 206. In addition, the processor 202 may receive a radio signal including fourth information/signal through the transceiver 206 and may store information obtained from signal processing of the fourth information/signal in the memory 204. The memory 204 may be connected to the processor 202 and may store various pieces of information related to the operation of the processor 202. For example, the memory 204 may store a software code including instructions to perform some or all of processes controlled by the processor 202 or to perform the descriptions, functions, procedures, proposals, methods, and/or operational flowcharts disclosed herein. Here, the processor 202 and the memory 204 may be part of a communication modem/circuit/chip designed to implement a radio communication technology (e.g., LTE or NR). The transceiver 206 may be connected with the processor 202 and may transmit and/or receive a radio signal via the at least one antennas 208. The transceiver 206 may include a transmitter and/or a receiver. The transceiver 206 may be replaced with an RF unit. In this specification, the wireless device may refer to a communication modem/circuit/chip.

Hereinafter, hardware elements of the wireless devices 100 and 200 are described in detail. At least one protocol layer may be implemented, but limited to, by the at least one processor 102 and 202. For example, the at least one processor 102 and 202 may implement at least one layer (e.g., a functional layer, such as PHY, MAC, RLC, PDCP, RRC, and SDAP layers). The at least one processor 102 and 202 may generate at least one protocol data unit (PDU) and/or at least one service data unit (SDU) according to the descriptions, functions, procedures, proposals, methods, and/or operational flowcharts disclosed herein. The at least one processor 102 and 202 may generate a message, control information, data, or information according to the descriptions, functions, procedures, proposals, methods, and/or operational flowcharts disclosed herein. The at least one processor 102 and 202 may generate a signal (e.g., a baseband signal) including a PDU, an SDU, a message, control information, data, or information according to the functions, procedures, proposals, and/or methods disclosed herein and may provide the signal to the at least one transceiver 106 and 206. The at least one processor 102 and 202 may receive a signal (e.g., a baseband signal) from the at least one transceiver 106 and 206 and may obtain a PDU, an SDU, a message, control information, data, or information according to the descriptions, functions, procedures, proposals, methods, and/or operational flowcharts disclosed herein.

The at least one processor 102 and 202 may be referred to as a controller, a microcontroller, a microprocessor, or a microcomputer. The at least one processor 102 and 202 may be implemented by hardware, firmware, software, or a combination thereof. For example, at least one application-specific integrated circuit (ASIC), at least one digital signal processor (DSP), at least one digital signal processing devices (DSPD), at least one programmable logic devices (PLD), or at least one field programmable gate array (FPGA) may be included in the at least one processor 102 and 202. The one or more processors 102 and 202 may be implemented as at least one computer readable medium (CRM) including instructions based on being executed by the at least one processor.

For example, each method described in FIGS. 16 to 21 may be performed by at least one computer readable medium (CRM) including instructions based on being executed by at least one processor. The CRM may perform, for example, receiving first configuration information informing of a position of a synchronization signal/physical broadcast channel block (SSB), receiving second configuration information informing of a monitoring occasion for detecting a wake up signal (WUS) and performing a second PDCCH monitoring in a next discontinuous reception (DRX)-on duration based on the UE being not required a first PDCCH monitoring for detecting the WUS as a resource of the monitoring occasion overlaps a resource of the SSB. In addition, the CRM may perform receiving configuration information indicating a long term evolution (LTE) cell-specific reference signal (CRS) resource, based on even one of resource elements for the monitoring occasion overlaps resource elements of the LTE CRS, the first PDCCH monitoring is not required in the monitoring occasion.

The descriptions, functions, procedures, proposals, methods, and/or operational flowcharts disclosed herein may be implemented using firmware or software, and the firmware or software may be configured to include modules, procedures, functions, and the like. The firmware or software configured to perform the descriptions, functions, procedures, proposals, methods, and/or operational flowcharts disclosed herein may be included in the at least one processor 102 and 202 or may be stored in the at least one memory 104 and 204 and may be executed by the at least one processor 102 and 202. The descriptions, functions, procedures, proposals, methods, and/or operational flowcharts disclosed herein may be implemented in the form of a code, an instruction, and/or a set of instructions using firmware or software.

The at least one memory 104 and 204 may be connected to the at least one processor 102 and 202 and may store various forms of data, signals, messages, information, programs, codes, indications, and/or commands. The at least one memory 104 and 204 may be configured as a ROM, a RAM, an EPROM, a flash memory, a hard drive, a register, a cache memory, a computer-readable storage medium, and/or a combinations thereof. The at least one memory 104 and 204 may be disposed inside and/or outside the at least one processor 102 and 202. In addition, the at least one memory 104 and 204 may be connected to the at least one processor 102 and 202 through various techniques, such as a wired or wireless connection.

The at least one transceiver 106 and 206 may transmit user data, control information, a radio signal/channel, or the like mentioned in the methods and/or operational flowcharts disclosed herein to at least different device. The at least one transceiver 106 and 206 may receive user data, control information, a radio signal/channel, or the like mentioned in the descriptions, functions, procedures, proposals, methods, and/or operational flowcharts disclosed herein from at least one different device. For example, the at least one transceiver 106 and 206 may be connected to the at least one processor 102 and 202 and may transmit and receive a radio signal. For example, the at least one processor 102 and 202 may control the at least one transceiver 106 and 206 to transmit user data, control information, or a radio signal to at least one different device. In addition, the at least one processor 102 and 202 may control the at least one transceiver 106 and 206 to receive user data, control information, or a radio signal from at least one different device. The at least one transceiver 106 and 206 may be connected to the at least one antenna 108 and 208 and may be configured to transmit or receive user data, control information, a radio signal/channel, or the like mentioned in the descriptions, functions, procedures, proposals, methods, and/or operational flowcharts disclosed herein through the at least one antenna 108 and 208. In this document, the at least one antenna may be a plurality of physical antennas or may be a plurality of logical antennas (e.g., antenna ports). The at least one transceiver 106 and 206 may convert a received radio signal/channel from an RF band signal into a baseband signal in order to process received user data, control information, a radio signal/channel, or the like using the at least one processor 102 and 202. The at least one transceiver 106 and 206 may convert user data, control information, a radio signal/channel, or the like, processed using the at least one processor 102 and 202, from a baseband signal to an RF bad signal. To this end, the at least one transceiver 106 and 206 may include an (analog) oscillator and/or a filter.

Figure 23:
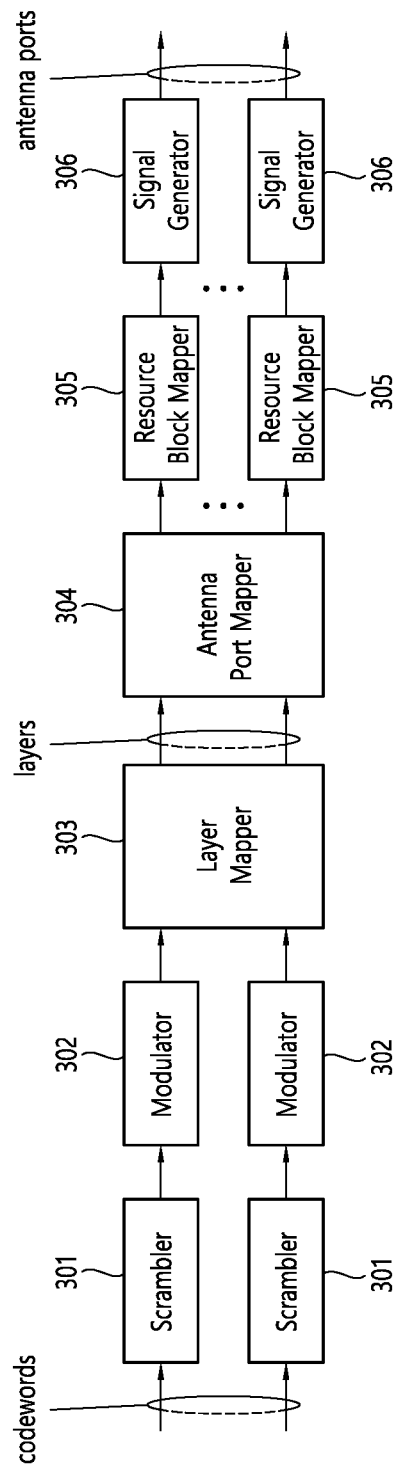
FIG. 23 illustrates a signal processing circuit for a transmission signal.

FIG. 23 shows an example of a structure of a signal processing module. Herein, signal processing may be performed in the processors 102 and 202 of FIG. 22.

Referring to FIG. 23, the transmitting device (e.g., a processor, the processor and a memory, or the processor and a transceiver) in a UE or BS may include a scrambler 301, a modulator 302, a layer mapper 303, an antenna port mapper 304, a resource block mapper 305, and a signal generator 306.

The transmitting device can transmit one or more codewords. Coded bits in each codeword are scrambled by the corresponding scrambler 301 and transmitted over a physical channel. A codeword may be referred to as a data string and may be equivalent to a transport block which is a data block provided by the MAC layer.

Scrambled bits are modulated into complex-valued modulation symbols by the corresponding modulator 302. The modulator 302 can modulate the scrambled bits according to a modulation scheme to arrange complex-valued modulation symbols representing positions on a signal constellation. The modulation scheme is not limited and m-PSK (m-Phase Shift Keying) or m-QAM (m-Quadrature Amplitude Modulation) may be used to modulate the coded data. The modulator may be referred to as a modulation mapper.

The complex-valued modulation symbols can be mapped to one or more transport layers by the layer mapper 303. Complex-valued modulation symbols on each layer can be mapped by the antenna port mapper 304 for transmission on an antenna port.

Each resource block mapper 305 can map complex-valued modulation symbols with respect to each antenna port to appropriate resource elements in a virtual resource block allocated for transmission. The resource block mapper can map the virtual resource block to a physical resource block according to an appropriate mapping scheme. The resource block mapper 305 can allocate complex-valued modulation symbols with respect to each antenna port to appropriate subcarriers and multiplex the complex-valued modulation symbols according to a user.

Signal generator 306 can modulate complex-valued modulation symbols with respect to each antenna port, that is, antenna-specific symbols, according to a specific modulation scheme, for example, OFDM (Orthogonal Frequency Division Multiplexing), to generate a complex-valued time domain OFDM symbol signal. The signal generator can perform IFFT (Inverse Fast Fourier Transform) on the antenna-specific symbols, and a CP (cyclic Prefix) can be inserted into time domain symbols on which IFFT has been performed. OFDM symbols are subjected to digital-analog conversion and frequency up-conversion and then transmitted to the receiving device through each transmission antenna. The signal generator may include an IFFT module, a CP inserting unit, a digital-to-analog converter (DAC) and a frequency upconverter.

Figure 24:
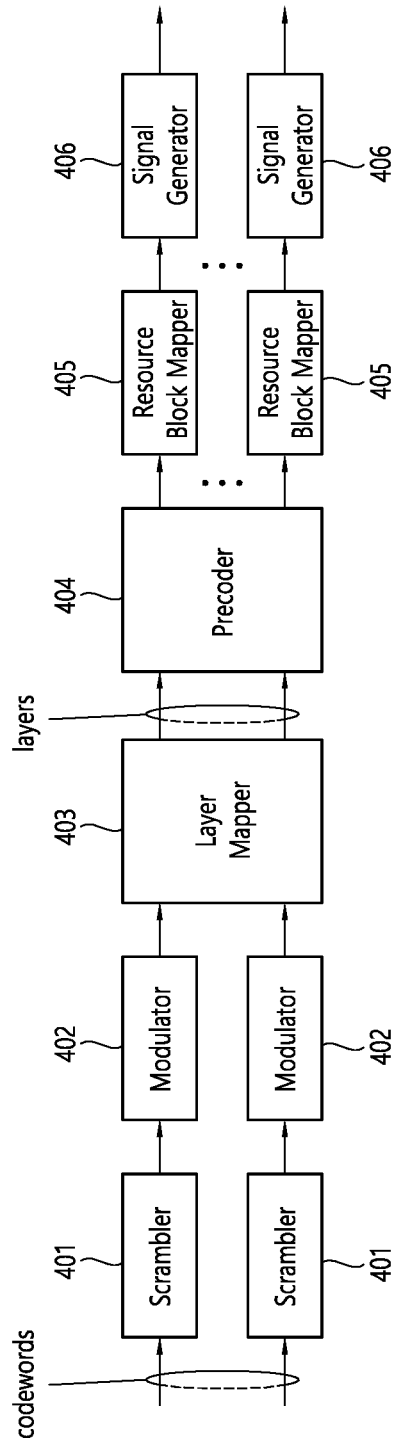
FIG. 24 shows another example of the structure of a signal processing module in a transmission device.

FIG. 24 shows another example of a structure of a signal processing module in a transmitting device. Herein, signal processing may be performed in a processor of a UE/BS, such as the processors 102 and 202 of FIG. 22.

Referring to FIG. 24, the transmitting device (e.g., a processor, the processor and a memory, or the processor and a transceiver) in the UE or the BS may include a scrambler 401, a modulator 402, a layer mapper 403, a precoder 404, a resource block mapper 405, and a signal generator 406.

The transmitting device can scramble coded bits in a codeword by the corresponding scrambler 401 and then transmit the scrambled coded bits through a physical channel.

Scrambled bits are modulated into complex-valued modulation symbols by the corresponding modulator 402. The modulator can modulate the scrambled bits according to a predetermined modulation scheme to arrange complex-valued modulation symbols representing positions on a signal constellation. The modulation scheme is not limited and pi/2-BPSK (pi/2-Binary Phase Shift Keying), m-PSK (m-Phase Shift Keying) or m-QAM (m-Quadrature Amplitude Modulation) may be used to modulate the coded data.

The complex-valued modulation symbols can be mapped to one or more transport layers by the layer mapper 403.

Complex-valued modulation symbols on each layer can be precoded by the precoder 404 for transmission on an antenna port. Here, the precoder may perform transform precoding on the complex-valued modulation symbols and then perform precoding. Alternatively, the precoder may perform precoding without performing transform precoding. The precoder 404 can process the complex-valued modulation symbols according to MIMO using multiple transmission antennas to output antenna-specific symbols and distribute the antenna-specific symbols to the corresponding resource block mapper 405. An output z of the precoder 404 can be obtained by multiplying an output y of the layer mapper 403 by an N×M precoding matrix W. Here, N is the number of antenna ports and M is the number of layers.

Each resource block mapper 405 maps complex-valued modulation symbols with respect to each antenna port to appropriate resource elements in a virtual resource block allocated for transmission.

The resource block mapper 405 can allocate complex-valued modulation symbols to appropriate subcarriers and multiplex the complex-valued modulation symbols according to a user.

Signal generator 406 can modulate complex-valued modulation symbols according to a specific modulation scheme, for example, OFDM, to generate a complex-valued time domain OFDM symbol signal. The signal generator 406 can perform IFFT (Inverse Fast Fourier Transform) on antenna-specific symbols, and a CP (cyclic Prefix) can be inserted into time domain symbols on which IFFT has been performed. OFDM symbols are subjected to digital-analog conversion and frequency up-conversion and then transmitted to the receiving device through each transmission antenna. The signal generator 406 may include an IFFT module, a CP inserting unit, a digital-to-analog converter (DAC) and a frequency upconverter.

The signal processing procedure of the receiving device may be reverse to the signal processing procedure of the transmitting device. Specifically, the processor of the transmitting device decodes and demodulates RF signals received through antenna ports of the transceiver. The receiving device may include a plurality of reception antennas, and signals received through the reception antennas are restored to baseband signals, and then multiplexed and demodulated according to MIMO to be restored to a data string intended to be transmitted by the transmitting device. The receiving device may include a signal restoration unit that restores received signals to baseband signals, a multiplexer for combining and multiplexing received signals, and a channel demodulator for demodulating multiplexed signal strings into corresponding codewords. The signal restoration unit, the multiplexer and the channel demodulator may be configured as an integrated module or independent modules for executing functions thereof. More specifically, the signal restoration unit may include an analog-to-digital converter (ADC) for converting an analog signal into a digital signal, a CP removal unit that removes a CP from the digital signal, an FET module for applying FFT (fast Fourier transform) to the signal from which the CP has been removed to output frequency domain symbols, and a resource element demapper/equalizer for restoring the frequency domain symbols to antenna-specific symbols. The antenna-specific symbols are restored to transport layers by the multiplexer and the transport layers are restored by the channel demodulator to codewords intended to be transmitted by the transmitting device.

Figure 25:
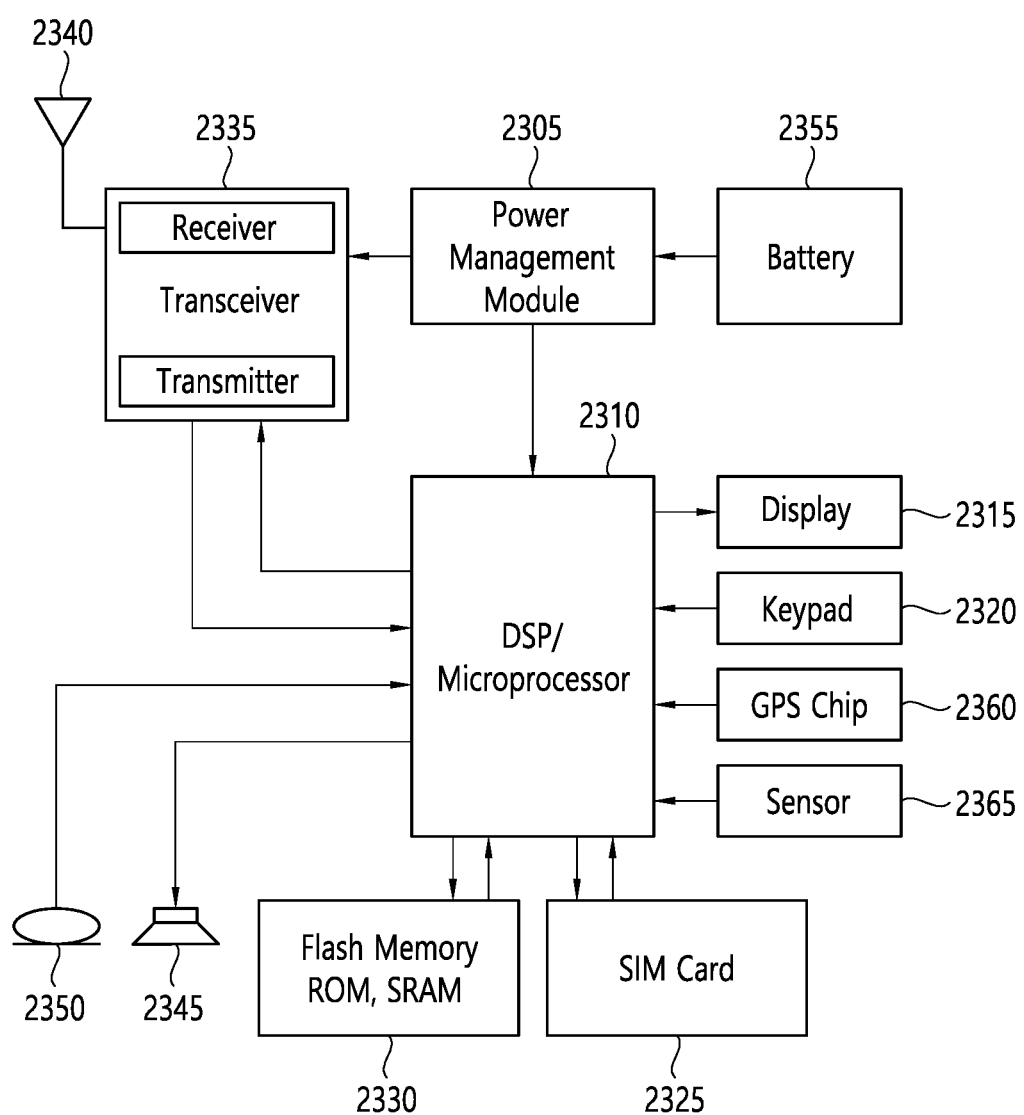
FIG. 25 illustrates an example of a wireless communication device according to an implementation of the present disclosure.

FIG. 25 illustrates an example of a wireless communication device according to an implementation example of the present disclosure.

Referring to FIG. 25, the wireless communication device, for example, a UE may include at least one of a processor 2310 such as a digital signal processor (DSP) or a microprocessor, a transceiver 2335, a power management module 2305, an antenna 2340, a battery 2355, a display 2315, a keypad 2320, a global positioning system (GPS) chip 2360, a sensor 2365, a memory 2330, a subscriber identification module (SIM) card 2325, a speaker 2345 and a microphone 2350. A plurality of antennas and a plurality of processors may be provided.

The processor 2310 can implement functions, procedures and methods described in the present description. The processor 2310 in FIG. 25 may be the processors 102 and 202 in FIG. 22.

The memory 2330 is connected to the processor 2310 and stores information related to operations of the processor. The memory may be located inside or outside the processor and connected to the processor through various techniques such as wired connection and wireless connection. The memory 2330 in FIG. 25 may be the memories 104 and 204 in FIG. 22.

A user can input various types of information such as telephone numbers using various techniques such as pressing buttons of the keypad 2320 or activating sound using the microphone 2350. The processor 2310 can receive and process user information and execute an appropriate function such as calling using an input telephone number. In some scenarios, data can be retrieved from the SIM card 2325 or the memory 2330 to execute appropriate functions. In some scenarios, the processor 2310 can display various types of information and data on the display 2315 for user convenience.

The transceiver 2335 is connected to the processor 2310 and transmit and/or receive RF signals. The processor can control the transceiver in order to start communication or to transmit RF signals including various types of information or data such as voice communication data. The transceiver includes a transmitter and a receiver for transmitting and receiving RF signals. The antenna 2340 can facilitate transmission and reception of RF signals. In some implementation examples, when the transceiver receives an RF signal, the transceiver can forward and convert the signal into a baseband frequency for processing performed by the processor. The signal can be processed through various techniques such as converting into audible or readable information to be output through the speaker 2345. The transceiver in FIG. 25 may be the transceivers 106 and 206 in FIG. 22.

Although not shown in FIG. 25, various components such as a camera and a universal serial bus (USB) port may be additionally included in the UE. For example, the camera may be connected to the processor 2310.

FIG. 25 is an example of implementation with respect to the UE and implementation examples of the present disclosure are not limited thereto. The UE need not essentially include all the components shown in FIG. 25. That is, some of the components, for example, the keypad 2320, the GPS chip 2360, the sensor 2365 and the SIM card 2325 may not be essential components. In this case, they may not be included in the UE.

Figure 26:
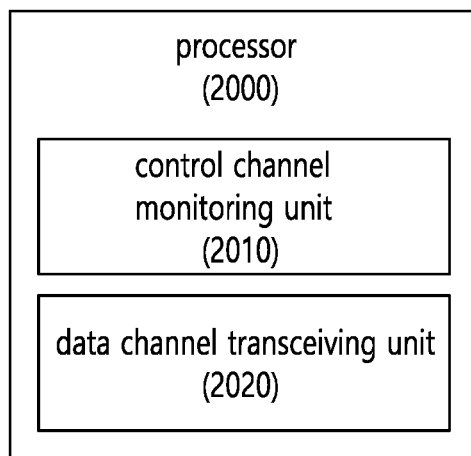
FIG. 26 shows an example of a processor 2000.

FIG. 26 shows an example of a processor 2000.

Referring to FIG. 26, the processor 2000 may include a control channel monitoring unit 2010 and a data channel receiving unit 2020. The processor 2000 may execute the methods (the position of the receiver) described with reference to FIGS. 16 to 21. For example, the processor 2000 may receive configuration information indicating the position of the SSB, information indicating the position (pattern) of the LTE CRS, and the like, and may receive configuration information indicating a monitoring occasion for WUS detection. For example, the monitoring occasion may be located in a time window between a time based on an offset relative to a start slot of a discontinuous reception (DRX)-on duration and the start slot, and WUS can be monitored in the monitoring occasion. If the monitoring occasion overlaps with at least one of the SSB resource and the LTE CRS resource, skip WUS monitoring in the monitoring occasion, but wake up in the next DRX-on duration to perform PDCCH monitoring for detecting DCI other than WUS. Thereafter, the PDSCH may be received (or PUSCH transmitted) based on the PDCCH, or an operation based on the detected DCI may be otherwise performed. The processor 2000 may be an example of the processors 102 and 202 of FIG. 22.

Figure 27:
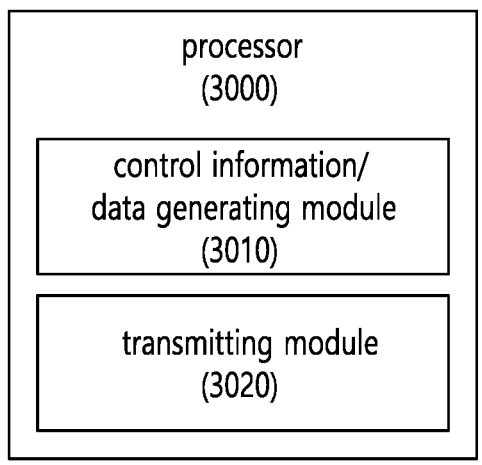
FIG. 27 shows an example of a processor 3000.

FIG. 27 shows an example of a processor 3000.

Referring to FIG. 27, the processor 3000 may include a control information/data generation module 3010 and a transmission module 3020. The processor 3000 may execute the methods described from the perspective of the transmitter in FIGS. 16 to 21. For example, the processor 3000 may generate and transmit the configuration information indicating the position of the SSB, information indicating the position (pattern) of the LTE CRS, and configuration information indicating the monitoring occasion (there may be a plurality) for WUS detection. For example, the monitoring occasion may be located in a time window between a time based on an offset (information about this offset can also be sent) with respect to a start slot of a discontinuous reception (DRX)-on duration and the start slot. The processor 3000 may send a WUS at any of the monitoring occasions. If the monitoring occasion overlaps with at least one of the SSB resource and the LTE CRS resource, the WUS (DCI format 2_6) may not be transmitted through the PDCCH in the monitoring occasion, and in the next DRX-on duration, a DCI other than the WUS may be transmitted through PDCCH. Thereafter, a PDSCH may be transmitted (or a PUSCH received), or a subsequent operation based on the DCI may be performed other than that. The processor 3000 may be an example of the processors 102 and 202 of FIG. 22.

Figure 28:
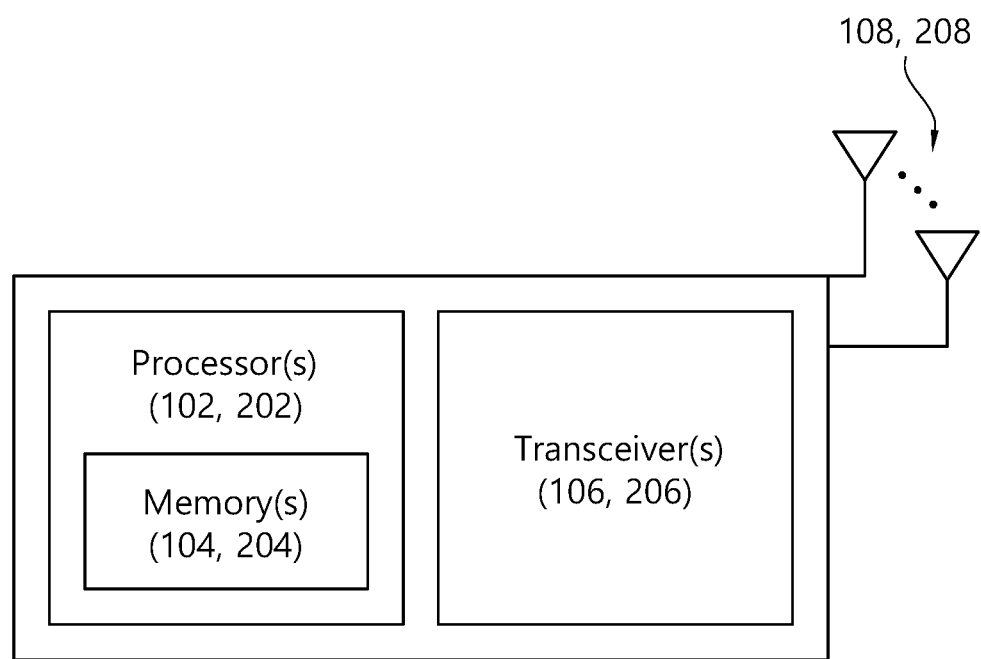
FIG. 28 shows another example of a wireless device.

FIG. 28 shows another example of a wireless device.

According to FIG. 28, a wireless device may include at least one processor 102, 202, at least one memory 104, 204, at least one transceiver 106, 206, and one or more antennas 108, 208.

The example of the wireless device described in FIG. 28 is different from the example of the wireless described in FIG. 22 in that the processors 102 and 202 and the memories 104 and 204 are separated in FIG. 22 whereas the memories 104 and 204 are included in the processors 102 and 202 in the example of FIG. 28. That is, the processor and the memory may constitute one chipset.

Figure 29:
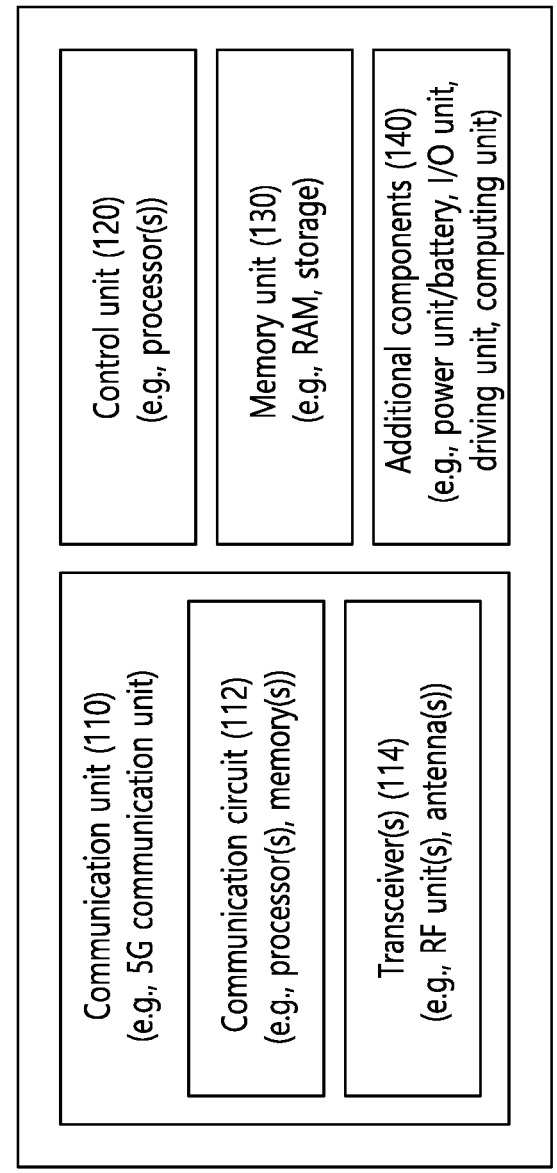
FIG. 29 shows another example of a wireless device applied to the present specification.

FIG. 29 shows another example of a wireless device applied to the present specification. The wireless device may be implemented in various forms according to a use-case/service.

Referring to FIG. 29, wireless devices 100 and 200 may correspond to the wireless devices of FIG. 22 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204. For example, the transceiver(s) 114 may include the one or more transceivers 106 and 206 and/or the one or more antennas 108 and 208 of FIG. 22. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. In addition, the control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 31), the vehicles (100*b*-1 and 100*b*-2 of FIG. 31), the XR device (100*c* of FIG. 31), the hand-held device (100*d* of FIG. 31), the home appliance (100*e* of FIG. 31), the IoT device (100*f* of FIG. 31), a digital broadcast UE, a hologram device, a public safety device, an MTC device, a medicine device, a fintech device (or a finance device), a security device, a climate/environment device, the AI server/device (400 of FIG. 31), the BSs (200 of FIG. 31), a network node, etc. The wireless device may be used in a mobile or fixed place according to a use-example/service.

In FIG. 29, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. In addition, each element, component, unit/portion, and/or module within the wireless devices 100 and 200 may further include one or more elements. For example, the control unit 120 may be configured by a set of one or more processors. For example, the control unit 120 may be configured by a set of a communication control processor, an application processor, an Electronic Control Unit (ECU), a graphical processing unit, and a memory control processor. For another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 30:
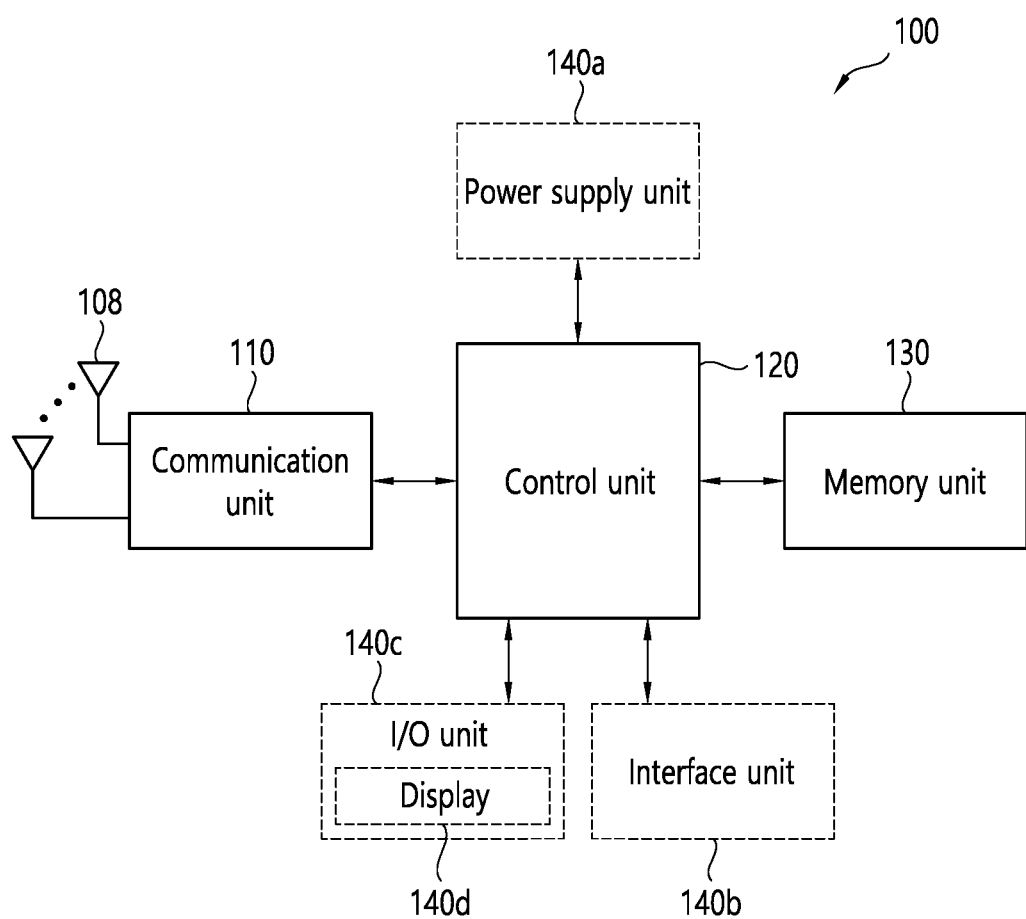
FIG. 30 illustrates a portable device applied to the present specification.

FIG. 30 illustrates a hand-held device applied to the present specification. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 30, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c respective correspond to the blocks 110 to 130/140 of FIG. 29.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. In addition, the memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

For example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. In addition, the communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 31:
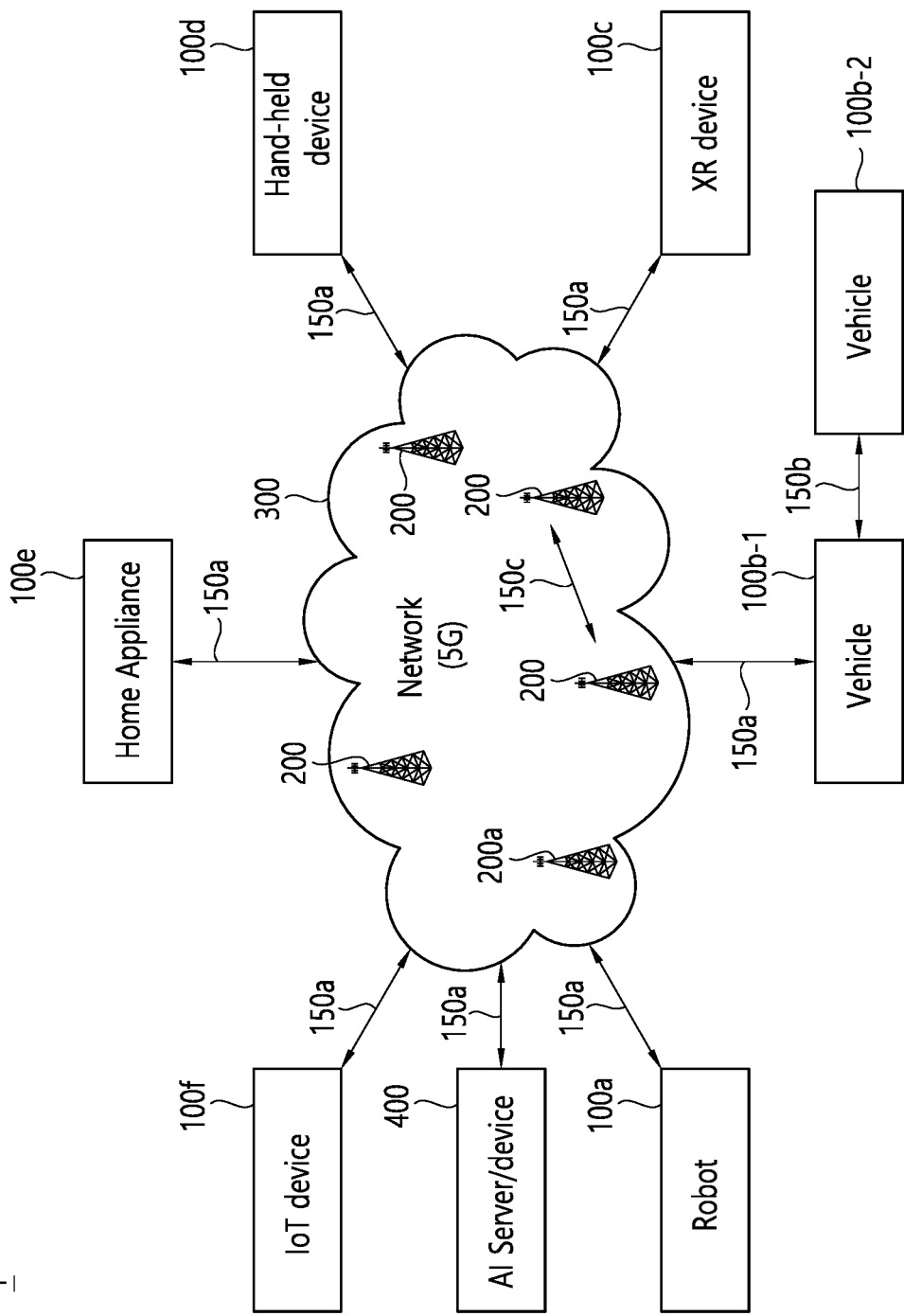
FIG. 31 illustrates the communication system 1 applied to this specification.

FIG. 31 illustrates a communication system 1 applied to the present specification.

Referring to FIG. 31, a communication system 1 applied to the present specification includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BS s/network. For example, the vehicles 100b-1 and 100b-2 may perform direct communication (e.g. Vehicle-to-Vehicle (V2V)/Vehicle-to-everything (V2X) communication). In addition, the IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BS s/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

NR supports a plurality of numerologies (or a plurality of ranges of subcarrier spacing (SCS)) in order to support a variety of 5G services. For example, when SCS is 15 kHz, a wide area in traditional cellular bands is supported; when SCS is 30 kHz/60 kHz, a dense-urban, lower-latency, and wider-carrier bandwidth is supported; when SCS is 60 kHz or higher, a bandwidth greater than 24.25 GHz is supported to overcome phase noise.

NR frequency bands may be defined as frequency ranges of two types (FR1 and FR2). The values of the frequency ranges may be changed. For example, the frequency ranges of the two types (FR1 and FR2) may be as shown in Table 7. For convenience of description, FR1 of the frequency ranges used for an NR system may refer to a "sub 6 GHz range", and FR2 may refer to an "above 6 GHz range" and may be referred to as a millimeter wave (mmW).

TABLE 8

| Frequency range designation | Corresponding frequency range | Subcarrier spacing |
| --- | --- | --- |
| FR1 | 450 MHz-6000 MHz | 15, 30, 60 kHz |
| FR2 | 24250 MHz-52600 MHz | 60, 120, 240 kHz |

As illustrated above, the values of the frequency ranges for the NR system may be changed. For example, FR1 may include a band from 410 MHz to 7125 MHz as shown in Table 8. That is, FR1 may include a frequency band of 6 GHz (or 5850, 5900, 5925 MHz, or the like) or greater. For example, the frequency band of 6 GHz (or 5850, 5900, 5925 MHz, or the like) or greater included in FR1 may include an unlicensed band. The unlicensed bands may be used for a variety of purposes, for example, for vehicular communication (e.g., autonomous driving).

TABLE 9

| Frequency range designation | Corresponding frequency range | Subcarrier spacing |
| --- | --- | --- |
| FR1 | 410 MHz-7125 MHz | 15, 30, 60 kHz |
| FR2 | 24250 MHz-52600 MHz | 60, 120, 240 kHz |

Figure 32:
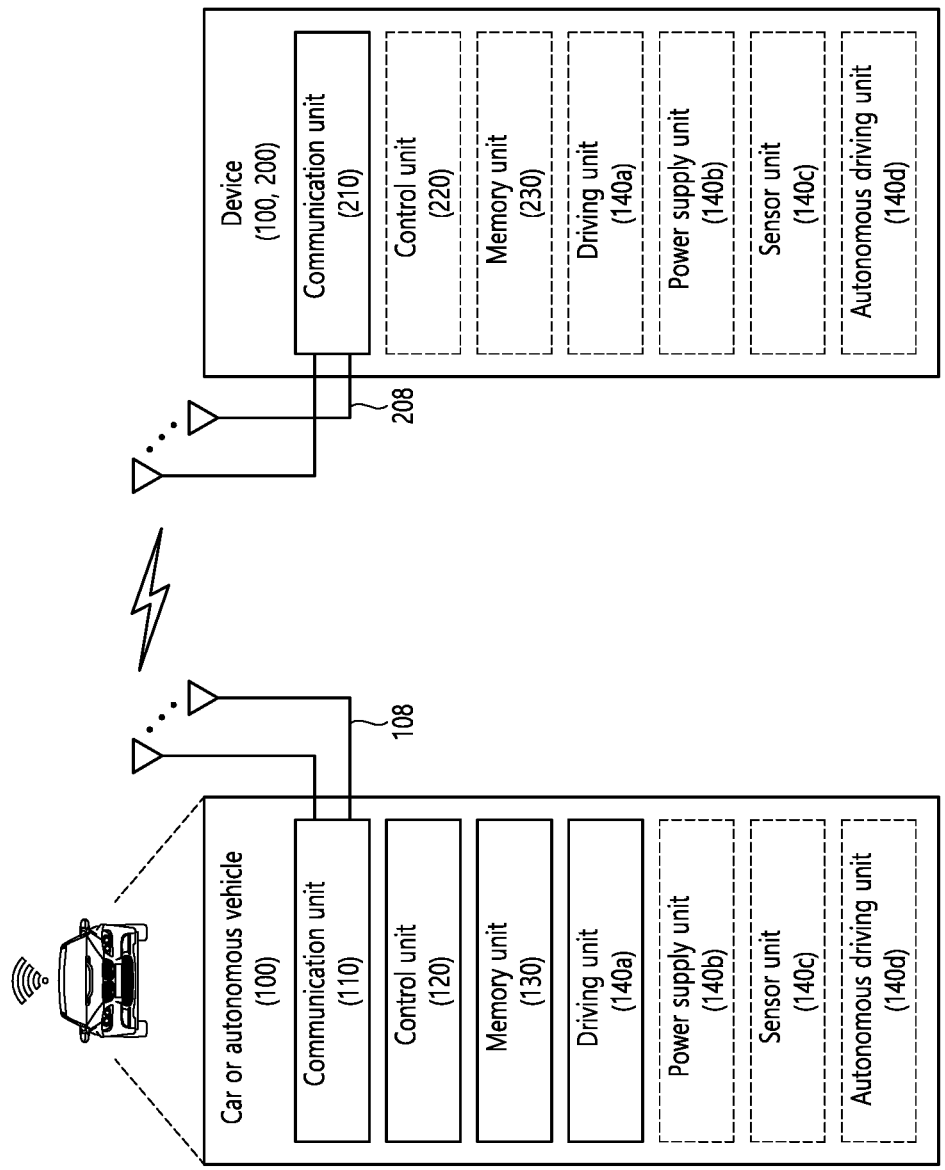
FIG. 32 illustrates a vehicle or autonomous driving vehicle that may be applied herein.

FIG. 32 illustrates a vehicle or an autonomous driving vehicle applied to this specification. The vehicle or the autonomous driving vehicle may be configured as a mobile robot, a car, a train, a manned/unmanned aerial vehicle (AV), a ship, or the like.

Referring to FIG. 32, the vehicle or the autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. Blocks 110/130/140a to 140d correspond to the blocks 110/130/140 in FIG. 29, respectively.

The communication unit 110 may transmit and receive a signal (e.g., data, a control signal, or the like) to and from external devices, such as a different vehicle, a base station (e.g. a base station, a road-side unit, or the like), and a server. The control unit 120 may control elements of the vehicle or the autonomous driving vehicle 100 to perform various operations. The control unit 120 may include an electronic control unit (ECU). The driving unit 140a may enable the vehicle or the autonomous driving vehicle 100 to run on the ground. The driving unit 140a may include an engine, a motor, a power train, wheels, a brake, a steering device, and the like. The power supply unit 140b supplies power to the vehicle or the autonomous driving vehicle 100 and may include a wired/wireless charging circuit, a battery, and the like. The sensor unit 140c may obtain a vehicle condition, environmental information, user information, and the like. The sensor unit 140c may include an inertial measurement unit (IMU) sensor, a collision sensor, a wheel sensor, a speed sensor, an inclination sensor, a weight sensor, a heading sensor, a position module, vehicular forward/backward vision sensors, a battery sensor, a fuel sensor, a tire sensor, a steering sensor, a temperature sensor, a humidity sensor, an ultrasonic sensor, an illuminance sensor, a pedal position sensor, and the like. The autonomous driving unit 140d may implement a technology for maintaining a driving lane, a technology for automatically adjusting speed, such as adaptive cruise control, a technology for automatic driving along a set route, a technology for automatically setting a route and driving when a destination is set, and the like.

For example, the communication unit 110 may receive map data, traffic condition data, and the like from an external server. The autonomous driving unit 140d may generate an autonomous driving route and a driving plan on the basis of obtained data. The control unit 120 may control the driving unit 140a to move the vehicle or the autonomous driving vehicle 100 along the autonomous driving route according to the driving plan (e.g., speed/direction control). During autonomous driving, the communication unit 110 may aperiodically/periodically obtain updated traffic condition data from the external server and may obtain surrounding traffic condition data from a neighboring vehicle. Further, during autonomous driving, the sensor unit 140c may obtain a vehicle condition and environmental information. The autonomous driving unit 140d may update the autonomous driving route and the driving plan on the basis of newly obtained data/information. The communication unit 110 may transmit information about a vehicle location, an autonomous driving route, a driving plan, and the like to the external server. The external server may predict traffic condition data in advance using AI technology or the like on the basis of information collected from vehicles or autonomous driving vehicles and may provide the predicted traffic condition data to the vehicles or the autonomous driving vehicles.

Claims disclosed in the present specification can be combined in various ways. For example, technical features in method claims of the present specification can be combined to be implemented or performed in an apparatus, and technical features in apparatus claims of the present specification can be combined to be implemented or performed in a method. Further, technical features in method claims and apparatus claims of the present specification can be combined to be implemented or performed in an apparatus. Further, technical features in method claims and apparatus claims of the present specification can be combined to be implemented or performed in a method.

What is claimed is:

1. A method of monitoring a physical downlink control channel (PDCCH) by a user equipment (UE), the method comprising:
receiving first configuration information informing of a position of a synchronization signal/physical broadcast channel block (SSB);
receiving second configuration information informing of a monitoring occasion for detecting a wake up signal (WUS), wherein the WUS informs of whether the UE wakes up in a next discontinuous reception (DRX)-on duration; and based on that a first PDCCH monitoring for detecting the WUS is not required as a resource of the monitoring occasion overlaps a resource of the SSB, performing a second PDCCH monitoring for detecting control information other than the WUS in the next DRX on duration.

2. The method of claim 1, wherein the first configuration information is received through a radio resource control (RRC) message.

3. The method of claim 1, wherein based on even one of resource elements for the monitoring occasion overlapping resource elements of the SSB, the first PDCCH monitoring is not required in the monitoring occasion.

4. The method of claim 1, wherein the wake-up signal is first downlink control information (DCI) including a wake-up indication.

5. The method of claim 4, wherein the second PDCCH monitoring is for detecting second DCI other than the first DCI.

6. The method of claim 1, wherein the monitoring occasion is positioned within a predetermined time from a start time of the next DRX-on duration.

7. The method of claim 1, wherein based on the first PDCCH monitoring for detecting the WUS not being required in the monitoring occasion, the first PDCCH monitoring is not performed in the monitoring occasion.

8. The method of claim 1, wherein, when the monitoring occasion is a plurality of monitoring occasions, based on the first PDCCH monitoring not being required in each of the plurality of monitoring occasions, the second PDCCH monitoring is performed in the next DRX-on duration.

9. The method of claim 1, further comprising:
receiving third configuration information informing of a long term evolution (LTE) cell-specific reference signal (CRS) resource.

10. The method of claim 9, wherein based on even one of resource elements for the monitoring occasion overlaps resource elements of the LTE CRS, the first PDCCH monitoring is not required in the monitoring occasion.

11. A user equipment (UE) comprising:
a transceiver; and
a processor connected to the transceiver,
wherein the processor is configured to:
receive first configuration information informing of a position of a synchronization signal/physical broadcast channel block (SSB);
receive second configuration information informing of a monitoring occasion for detecting a wake up signal (WUS), wherein the WUS informs of whether the UE wakes up in a next discontinuous reception (DRX)-on duration; and
based on that a first PDCCH monitoring for detecting the WUS is not required as a resource of the monitoring occasion overlaps a resource of the SSB, perform a second PDCCH monitoring for detecting control information other than the WUS in the next DRX on duration.

12. The UE of claim 11, wherein based on even one of resource elements for the monitoring occasion overlapping resource elements of the SSB, the first PDCCH monitoring is not required in the monitoring occasion.

13. The UE of claim 11, wherein the wake-up signal is first downlink control information (DCI) including a wake-up indication.

14. The UE of claim 13, wherein the second PDCCH monitoring is for detecting second DCI other than the first DCI.

15. The UE of claim 11, wherein the monitoring occasion is positioned within a predetermined time from a start time of the next DRX-on duration.

16. The UE of claim 11, wherein based on the first PDCCH monitoring for detecting the WUS not being required in the monitoring occasion, the first PDCCH monitoring is not performed in the monitoring occasion.

17. The UE of claim 11, wherein, when the monitoring occasion is a plurality of monitoring occasions, based on the first PDCCH monitoring not being required in each of the plurality of monitoring occasions, the second PDCCH monitoring is performed in the next DRX-on duration.

18. The UE of claim 11, further comprising:
receiving third configuration information informing of a long term evolution (LTE) cell-specific reference signal (CRS) resource.

19. The UE of claim 18, wherein based on even one of resource elements for the monitoring occasion overlaps resource elements of the LTE CRS, the first PDCCH monitoring is not required in the monitoring occasion.

20. An apparatus operated in a wireless communication system, the apparatus comprising:
a processor; and
a memory to be operatively connected to the processor,
wherein the processor is configured to:
receive first configuration information informing of a position of a synchronization signal/physical broadcast channel block (SSB);
receive second configuration information informing of a monitoring occasion for detecting a wake up signal (WUS), wherein the WUS informs of whether the UE wakes up in a next discontinuous reception (DRX)-on duration; and
based on that a first PDCCH monitoring for detecting the WUS is not required as a resource of the monitoring occasion overlaps a resource of the SSB, perform a second PDCCH monitoring for detecting control information other than the WUS in the next DRX on duration.

\* \* \* \* \*